(12) United States Patent
Yamada et al.

(10) Patent No.: US 9,786,951 B2
(45) Date of Patent: Oct. 10, 2017

(54) BATTERY AND BATTERY PACK

(71) Applicant: Sony Corporation, Tokyo (JP)

(72) Inventors: Ichiro Yamada, Fukushima (JP); Tomoyuki Shiratsuchi, Fukushima (JP); Toru Odani, Fukushima (JP)

(73) Assignee: Sony Corporation, Tokyo (JP)

( * ) Notice: Subject to any disclaimer, the term of this patent is extended or adjusted under 35 U.S.C. 154(b) by 234 days.

(21) Appl. No.: 14/643,419

(22) Filed: Mar. 10, 2015

(65) Prior Publication Data

US 2015/0188190 A1 Jul. 2, 2015

Related U.S. Application Data

(63) Continuation of application No. 13/748,059, filed on Jan. 23, 2013, now Pat. No. 8,986,893.

(30) Foreign Application Priority Data

Jan. 26, 2012 (JP) .................................. 2012-014502

(51) Int. Cl.
*H01M 10/056* (2010.01)
*H01M 10/0565* (2010.01)
(Continued)

(52) U.S. Cl.
CPC ......... *H01M 10/0565* (2013.01); *H01M 2/18* (2013.01); *H01M 4/131* (2013.01); *H01M 4/136* (2013.01); *H01M 4/505* (2013.01); *H01M 4/525* (2013.01); *H01M 4/5825* (2013.01); *H01M 10/02* (2013.01); *H01M 10/052* (2013.01); *H01M 10/056* (2013.01);
(Continued)

(58) Field of Classification Search
CPC .. H01M 10/0565; H01M 4/131; H01M 4/525; H01M 4/136; H01M 10/0568; H01M 4/505; H01M 10/0525; H01M 4/5825; H01M 10/4257; H01M 2220/30; H01M 2300/0025; H01M 2300/0082
See application file for complete search history.

(56) References Cited

U.S. PATENT DOCUMENTS

2003/0180623 A1  9/2003  Yun

FOREIGN PATENT DOCUMENTS

| CN | 101290992 | 10/2008 |
|---|---|---|
| JP | 08-511274 | 11/1996 |
| JP | 2004-031131 | 1/2004 |
| JP | 2004-165151 | 6/2004 |

(Continued)

OTHER PUBLICATIONS

Office Action received in CN Application 201310020188.1, mailed Feb. 1, 2016, 15 pages.

*Primary Examiner* — Cynthia K Walls
(74) *Attorney, Agent, or Firm* — K&L Gates LLP

(57) ABSTRACT

Batteries and battery packs are provided. In one embodiment, the battery includes a positive electrode, a negative electrode, and an electrolyte including a fluidic electrolyte and a non-fluidic electrolyte. The fluidic electrolyte is configured to be imaged as a void image in a secondary electron image and a reflection electron image obtained by energy dispersive X-ray spectroscopy, and the non-fluidic electrolyte is configured to be imaged in the secondary electron image and the reflection electron image with a non-fluidic electrolyte contrast different from a contrast associated with a member selected from the group consisting of a solid current collector, an active material, a conductive material, a binding material and a separator.

28 Claims, 10 Drawing Sheets

(51) Int. Cl.
*H01M 4/505* (2010.01)
*H01M 4/525* (2010.01)
*H01M 4/131* (2010.01)
*H01M 10/42* (2006.01)
*H01M 2/18* (2006.01)
*H01M 4/136* (2010.01)
*H01M 10/02* (2006.01)
*H01M 10/0525* (2010.01)
*H01M 10/48* (2006.01)
*H01M 4/58* (2010.01)
*H01M 10/0568* (2010.01)
*H01M 10/052* (2010.01)
*H01M 10/0566* (2010.01)
*H01M 2/16* (2006.01)

(52) U.S. Cl.
CPC ... *H01M 10/0525* (2013.01); *H01M 10/0566* (2013.01); *H01M 10/0568* (2013.01); *H01M 10/4257* (2013.01); *H01M 10/48* (2013.01); *H01M 2/1686* (2013.01); *H01M 2220/30* (2013.01); *H01M 2300/0025* (2013.01); *H01M 2300/0082* (2013.01); *Y02E 60/122* (2013.01); *Y02T 10/7011* (2013.01)

(56) References Cited

FOREIGN PATENT DOCUMENTS

| | | |
|---|---|---|
| JP | 2007-257958 | 10/2007 |
| JP | 2009-070636 | 4/2009 |
| JP | 2009-535764 | 10/2009 |
| JP | 2010-129449 | 6/2010 |
| JP | 2011054408 | 3/2011 |

BATTERY AND BATTERY PACK

CROSS REFERENCES TO RELATED APPLICATIONS

The present application is a continuation of U.S. application Ser. No. 13/748,059, filed on Jan. 23, 2013, which claims priority to Japanese Priority Patent Application JP 2012-014502 filed in the Japan Patent Office on Jan. 26, 2012, the entire content of each of which is hereby incorporated by reference.

BACKGROUND

The present disclosure relates to a battery, a battery pack, an electronic apparatus, an electrically driven vehicle, an electrical storage device, and an electric power system.

In recent years, portable electronic apparatuses such as camera-integrated VTRs (Video Tape Recorder), cellular phone, and notebook PCs have become widespread, and a reduction in size, weight, and thickness, and a longer operational lifespan have been strongly desired. Along with this, the development of a battery as a power supply, particularly, a secondary battery, which is light in weight, and which can obtain a high energy density, has been progressed.

Among these, a secondary battery (a so-called lithium ion secondary battery) using occlusion and emission of lithium (Li) in a charge and discharge reaction may obtain an energy density higher than that of a lead battery or a nickel cadmium battery, and thus has been greatly anticipated. As this secondary battery, a laminated film type battery in which an electrode body is packaged with a laminated film to realize a reduction in weight and thickness has been widely used.

This laminated film type battery is light and thus energy density is large. However, accompanying deformation of an exterior packaging member due to gas generation or the like inside the battery, liquid leakage or the like becomes problematic in a case where an electrolyte composed of a fluidic electrolyte similar to an electrolytic solution in the related art is used. As a method of solving this problem, using of a non-fluidic electrolyte has attracted attention in the laminated film type battery. In a battery using the non-fluidic electrolyte, the liquid leakage is less concerned and stability increases, and thus there is an advantage in that a light and thin material such as an aluminum laminated film may be used for an exterior packaging member.

However, in recent electronic apparatuses, since there is a tendency for high-performance and multi-function to further progress, charging and discharging of the secondary battery is frequently repeated, and thus charge and discharge capacity has a tendency to decrease. Particularly, deterioration is significant in a low-temperature environment, and thus an improvement in the battery characteristics is further desired. In addition, in electrical storage usage for a vehicle or electric power equalization, the battery may be used in an environment in which an ambient temperature is low, and thus an improvement in battery characteristic is desired.

In the secondary battery using the non-fluidic electrolyte, these characteristics are particularly problematic. That is, in the electrolytic solution having fluidity of the related art, migration of ions in a liquid becomes easy. Conversely, ion conductivity decreases in the non-fluidic electrolyte due to the viscosity thereof. In addition, in a case where a highly deformable exterior packaging material is used for the laminated film, there is a problem in that an electrode body has a tendency to deform, and thus adhesiveness between electrodes decreases, and a battery characteristic further deteriorates. This tendency becomes more significant in a battery using a laminated electrode body in which sheet-shaped electrodes are laminated.

To improve this performance, Japanese Unexamined Patent Application Publication Nos. 08-511274 and 2009-70636 suggest a technology of using ionic liquid (bis (fluorosulfonyl) imide or the like is used as an anion) as an electrolytic solution. Japanese Unexamined Patent Application Publication Nos. 08-511274 and 2009-70636 disclose a method in which charge transfer resistance in a battery is decreased by using the electrolytic solution, and thus an output characteristic and a cycle characteristic of a battery are improved.

In addition, Japanese Unexamined Patent Application Publication Nos. 2004-165151 and 2010-129449 disclose a technology of using an electrolyte in which a compound that forms a film called an SEI (Solid Electrolyte Interface) on an electrode during charging and discharging of a battery at an initial period of use is added into a solvent in advance. Japanese Unexamined Patent Application Publication Nos. 2004-165151 and 2010-129449 disclose a method in which an electrode surface is stabilized by forming the SEI on the electrode, and thus a decrease in the output characteristic and the cycle characteristic of a battery is suppressed.

SUMMARY

However, in the electrolyte including the electrolyte salt disclosed in Japanese Unexamined Patent Application Publication Nos. 08-511274, 2009-70636, 2004-165151 and 2010-129449, the battery characteristic is improved to a certain degree, but it is necessary to further improve the problem of a decrease of the above-described battery characteristic in a case where increasingly high capacity is attempted in the future. Particularly, this phenomenon becomes significant in long-term use, and use in a high-temperature environment or a low-temperature environment, resulting in a further deterioration of the battery characteristic due to a decrease in ion conductivity.

It is desirable to provide a battery in which a decrease in battery characteristic may be suppressed in long-term use, or use in a high-temperature environment or a low-temperature environment. In addition, it is desirable to provide a battery pack, an electronic apparatus, an electrically driven vehicle, an electrical storage device, and an electric power system that use the battery.

According to an embodiment of the present disclosure, there is provided a battery including a positive electrode, a negative electrode, and an electrolyte including a fluidic electrolyte and a non-fluidic electrolyte, the fluidic electrolyte configured to be imaged as a void image in a secondary electron image and a reflection electron image obtained by energy dispersive X-ray spectroscopy, and the non-fluidic electrolyte configured to be imaged in the secondary electron image and the reflection electron image with a non-fluidic electrolyte contrast different from a contrast associated with a member selected from the group consisting of a solid current collector, an active material, a conductive material, a binding material and a separator.

In the battery of the present disclosure, it is preferable that the non-fluidic electrolyte be present between the positive electrode and the negative electrode, the fluidic electrolyte be present at least in a void inside active material layers of the positive electrode and the negative electrode. It is more preferable that the fluidic electrolyte be present between the positive electrode and the negative electrode.

In the battery of the present disclosure, it is preferable that a porous separator be interposed between the positive electrode and the negative electrode, and the non-fluidic electrolyte be present between at least one of the positive electrode and the negative electrode, and the separator.

In the battery of the present disclosure, it is preferable that the electrolyte salt contain an imide salt compound expressed by Chem. 1. Particularly, it is preferable that the electrolyte salt be an imide salt compound expressed by Chem. 1 in which at least one Z is a fluorine atom.

$$M^+[(ZY)_2N]^-  \quad \text{(Chem. 1)}$$

(here, $M^+$ represents a monovalent cation, Y represents $SO_2$ or CO, and Z independently represents a fluorine atom or a polymerizable functional group).

In the battery of the present disclosure, it is preferable that a volume ratio of the non-fluidic electrolyte in the electrolyte be 0 to 6 vol %.

In the battery of the present disclosure, it is preferable that a weight-average molecular weight of the polymeric material be 500,000 or more.

In the battery of the present disclosure, it is preferable that the positive electrode active material be a lithium composite phosphate having an olivine type structure expressed by Chem. I, $$Li_aM1_bPO_4 \quad \text{(Chem. I)}$$

(here, M1 represents at least one kind of element selected from elements of group II to group XV, and a and b represent values within ranges of $0 \leq a \leq 2.0$ and $0.5 \leq b \leq 2.0$).

A battery pack, an electronic apparatus, an electrically driven vehicle, an electrical storage system, and an electrical power system of the present disclosure include the above-described battery.

According to the present disclosure, it is possible to provide a battery in which a non-fluidic electrolyte improves adhesiveness between electrodes, the fluidic electrolyte maintains high ion conductivity, and thus high battery characteristic may be maintained even in a high-temperature environment or a low-temperature environment.

Additional features and advantages are described herein, and will be apparent from the following Detailed Description and the figures.

DETAILED DESCRIPTION

Figure 1:
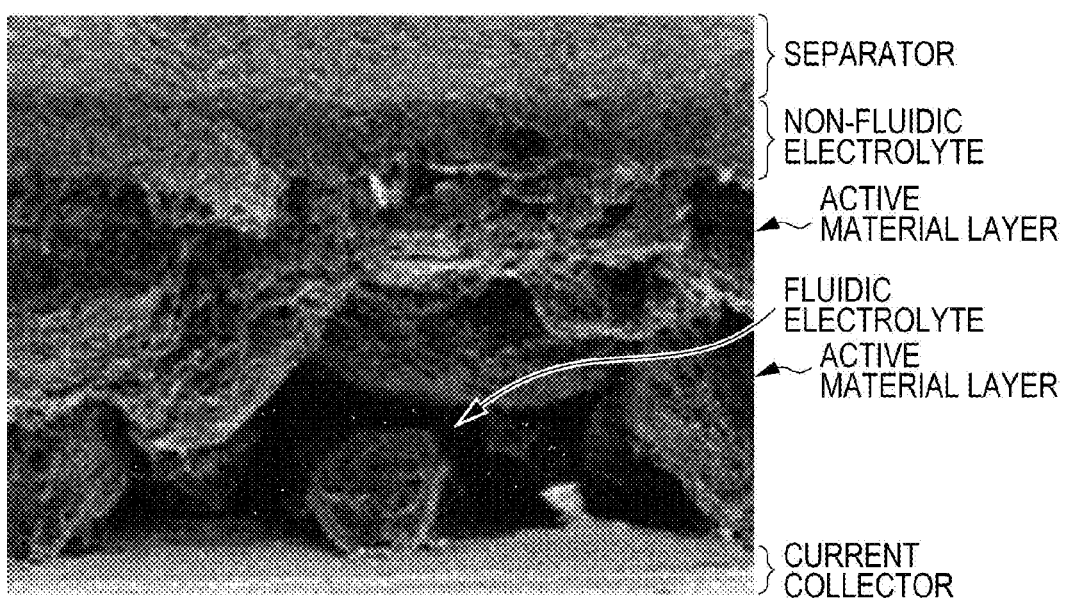
FIG. 1 is a secondary electron image of an electrode body, in which the secondary electron image is obtained by an energy dispersive X-ray spectroscopy (SEM-EDX) and illustrates a state of non-fluidic electrolyte and electrolytic solution of the present disclosure of a cross-section.

Hereinafter, preferred embodiments (hereinafter, referred to as embodiment) for carrying out the present disclosure will be described. In addition, the description will be made as follows.

1. First Embodiment (Example of Electrolyte of the Present Disclosure)

2. Second Embodiment (Example of Laminated Film Type Battery Using Electrolyte of Present Disclosure)

3. Third Embodiment (Example of Square Battery Using Electrolyte of Present Disclosure)

4. Fourth Embodiment (Example of Cylindrical Battery Using Electrolyte of Present Disclosure)

5. Fifth Embodiment (Example of Battery Pack Using Electrolyte of Present Disclosure)

6. Sixth Embodiment (Example of Electrical Storage System Using Battery, or the like)

1. First Embodiment

In this first embodiment, an electrolyte of the present disclosure will be described.

The electrolyte of the present disclosure includes: a fluidic electrolyte in which an electrolytic solution containing a solvent and an electrolyte salt is present while maintaining fluidity, and a non-fluidic electrolyte in which an electrolytic solution containing a solvent and an electrolyte salt is supported by a polymeric material. In the electrolyte of the present disclosure, the non-fluidic electrolyte may be present between the positive electrode and the negative electrode making up the battery, and the fluidic electrolyte may be present at least in a void inside active material layers of the positive electrode and the negative electrode. It is preferable that the fluidic electrolyte be present between the positive electrode and the negative electrode. In addition, a porous separator may be interposed between the positive electrode and the negative electrode, and the non-fluidic electrolyte may be present between at least one of the positive electrode and the negative electrode, and the separator. In addition, the fluidic electrolyte may be an electrolytic solution that is obtained by eluting a part of the polymeric material contained in the non-fluidic electrolyte. Even when the electrolytic solution contains the polymeric material, in a case where fluidity is maintained, the electrolytic solution is regarded as the fluidic electrolyte.

In the battery of the present disclosure, both of the fluidic electrolyte and the non-fluidic electrolyte are present as an electrolyte. Therefore, the non-fluidic electrolyte brings the positive electrode and the negative electrode into close contact with each other. As a result, deformation of the electrodes is suppressed, a decrease in battery reactivity between the positive electrode and the negative electrode is suppressed, a fluidized electrolyte maintains high ion conductivity in the electrolyte due to fluidity thereof. Furthermore, since the non-fluidic electrolyte brings the positive electrode and the negative electrode into close contact with each other, deformation of the electrodes due to expansion and contraction accompanying charging and discharging is not likely to occur, and a decrease in battery reactivity due to a decrease in adhesiveness between the positive electrode and the negative electrode may be suppressed.

In the electrolyte of the present disclosure, it is preferable that a volume ratio of the non-fluidic electrolyte layer be 0 to 6 vol % on the basis of the total volume of the entire electrolytes, that is, the non-fluidic electrolyte layer and the fluidic electrolyte. Due to this, high ion conductivity due to the fluidic electrolyte and the adhesiveness between electrodes due to the non-fluidic electrolyte layer may be obtained in a relatively appropriate manner.

In addition, in the electrolyte of the present disclosure, it is preferable that a volume ratio of the polymeric material be 0 to 0.3 vol % on the basis of the total pore volume of the positive electrode, the negative electrode, and the separator.

In addition, the non-fluidic electrolyte layer and the fluidic electrolyte, which are formed in the battery, of the present disclosure may be analyzed, for example, in such a manner that after the battery is disassembled to take out an electrode body including the positive electrode and the negative electrode, the contrast of a SEM image such as a secondary electron image and a reflection electron image of a cross-section of the electrode body is analyzed by an energy dispersive X-ray spectroscopy (SEM-EDX).

In a case of confirming the volume ratio of the non-fluidic electrolyte layer from the contrast of the secondary electron image and the reflection electron image of the cross-section of the electrode body, for example, an area ratio of an area of the non-fluidic electrolyte and an area of the fluidic electrolyte is calculated from the SEM image, which is obtained by the energy dispersive X-ray spectroscopy (SEM-EDX), or the like, and this area ratio may be set as a volume ratio of the non-fluidic electrolyte and the fluidic electrolyte. As shown in FIG. 1, in the secondary electron image and the reflection electron image, an electrolytic solution that is a liquid fluidic electrolyte is not photographed actually as an image, and is confirmed as a void portion (that is, a void portion of the active material layer) between the solid current collector, the active material, and a conductive material or a binding material, or as a vacant portion of the separator. In addition, the semi-solid non-fluidic electrolyte is expressed with a contrast different from that of the solid current collector, the active material, the conductive material or a binding material, or the separator.

In addition, the formation ratio of the non-fluidic electrolyte layer and the fluidic electrolyte may be analyzed by performing an element analysis of the electrolytes using an element analysis method in the related art, that is, the energy dispersive X-ray spectroscopy (SEM-EDX) or the like. In a case of using this method, so as to prevent unnecessary components in the electrolyte from being unintentionally analyzed, it is preferable that the analysis be performed after cleaning the surface of the electrodes with an organic solvent such as dimethyl carbonate (DMC).

Electrolytic Solution

An electrolytic solution includes a solvent and an electrolyte salt.

As the solvent, for example, a non-aqueous solvent may be used. Examples of the non-aqueous solvent include ethylene carbonate (EC), propylene carbonate (PC), butylene carbonate, dimethyl carbonate, diethyl carbonate, ethyl methyl carbonate, methyl propylcarbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide, and the like. These may be used alone or plural kinds thereof may be mixed and used.

Among these, it is preferable to use at least one selected from a group consisting of ethylene carbonate, propylene carbonate, dimethyl carbonate, diethyl carbonate and ethyl methyl carbonate as the non-aqueous solvent. In this case, particularly, it is preferable to use a combination of a high viscosity (high dielectric constant) solvent (for example, specific dielectric constant $\in \geq 30$) such as ethylene carbonate and propylene carbonate and a low viscosity solvent (for example, viscosity ≤1 mPa·s) such as dimethyl carbonate, diethyl carbonate and ethyl methyl carbonate. This is because dissociation and ion mobility of the electrolyte salt are improved and thus a relatively superior effect may be obtained.

As the electrolyte salt, one or more kinds of light metal salts such as a lithium salt may be contained. Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among these, at least one selected from a group consisting of lithium hexafluorophosphate, lithium tetrafluoroborate, lithium perchlorate, and lithium hexafluoroarsenate is preferable, and lithium hexafluorophosphate and lithium tetrafluoroborate are more preferable.

As the electrolyte salt, an imide salt compound expressed by Chem. 1 to be described below may be contained. The imide salt compound has a special merit in that the imide salt is not likely to be decomposed in a high-temperature environment. Therefore, it is preferable to use the imide salt compound as the electrolyte salt from the viewpoint that a decrease in battery characteristic during use in the high-temperature environment or during use after being stored in the high-temperature environment may be suppressed.

In addition, when being subjected to a high-temperature non-fluidization treatment during formation, the non-fluidic electrolyte may increase adhesiveness between electrodes. Therefore, when the high-temperature treatment is performed during formation of the non-fluidic electrolyte, it is preferable to use the imide salt compound that is not likely to be decomposed under the high-temperature environment as the electrolyte salt. As a result, the adhesiveness between electrodes may be increased without causing a decrease in battery reactivity due to decomposition of the imide salt compound.

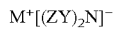 (Chem. 1)

$$M^+[(ZY)_2N]^-$$

(here, $M^+$ represents a monovalent cation, Y represents $SO_2$ or CO, and each substituent group Z independently represents a fluorine atom or a polymerizable functional group.)

Examples of the cation ion making up $M^+$ include alkali metal ions such as a lithium ion ($Li^+$), a sodium ion ($Na^+$), and a potassium ion ($K^+$), other metallic element ions, an ammonium cation, a phosphonium cation, and the like. Among these, the lithium ion is preferable.

Examples of the imide salt compound expressed in Chem. 1 include various imide salt compounds such as lithium bis(fluorosulfonyl)imide, lithium (fluorosulfonyl)(trifluoromethylsulfonyl)imide, and lithium bis(trifluoromethyl sulfonyl)imide.

Furthermore, as the imide salt compound, it is preferable to use a compound in which at least one substituent group Z in Chem. 1 is a fluorine atom (it may be perfluorinated). This is because relatively superior battery characteristics are obtained. Examples of the imide salt compound include lithium bis(fluorosulfonyl)imide, lithium(fluorosulfonyl) (trifluoromethyl sulfonyl)imide, lithium(fluorosulfonyl) (pentafluoroethyl sulfonyl)imide, lithium(fluorosulfonyl) (nonafluorobutyl sulfonyl)imide, lithium(fluorosulfonyl) (phenyl sulfonyl)imide, lithium(fluorosulfonyl) (pentafluorophenyl sulfonyl)imide, lithium(fluorosulfonyl) (vinyl sulfonyl)imide, and the like. These imide salt compounds may be used alone or two or more kinds thereof may be mixed and used. Here, the imide salt compound in Chem. 1 is not limited to these imide salt compounds.

The content of the electrolyte salt in the electrolytic solution is preferably 0.6 to 2.0 mol/kg with respect to the solvent, and more preferably 0.6 to 1.5 mol/kg. This is because high ion conductivity may be obtained.

Non-Fluidic Electrolyte

The non-fluidic electrolyte may be composed of a completely solid type electrolyte formed from a solid having ion conductivity, but it is preferable to use a semi-solid electrolyte that is non-fluidized while a polymeric material supports the electrolytic solution. In this case, as the electrolytic solution that is supported by the polymeric material, the above-described electrolytic solution may be used.

A mass ratio of the electrolytic solution that is supported in the non-fluidic electrolyte is preferably 90 to 99 mass % or less with respect to the non-fluidic electrolyte. In addition, in regard to the electrolyte of the present disclosure, which is present between the positive electrode and the negative electrode as described, the volume ratio of the polymeric material is preferably 0 to 0.3 vol % on the basis of the total void volume of the positive electrode, the negative electrode, and the separator, but when considering the specific gravity of the polymeric material, the mass ratio of the electrolytic solution that is supported in the non-fluidic electrolyte corresponds to the above-described range. In a case where the amount of the electrolytic solution that is supported in the non-fluidic electrolyte is excessive, an effect sufficient for maintenance of the battery shape due to close contact between electrodes may not be obtained. In a case where the amount of the electrolytic solution that is supported in the non-fluidic electrolyte is insufficient, ion conductivity in the non-fluidic electrolyte becomes insufficient, and thus there is a concern that the battery characteristics may decrease.

As the polymeric material, various materials may be used, but there are polymeric materials, which are preferably and appropriately used, respectively, in accordance with methods of forming a layer of the non-fluidic electrolyte. Therefore, a method of forming the non-fluidic electrolyte layer will be described.

As the method of forming the non-fluidic electrolyte layer, a method of subjecting an electrolytic solution or a semi-solid electrolyte precursor to non-fluidization treatment is preferably used. Preferable examples of the method include (1) a method of impregnating the electrolytic solution into the polymeric material at normal temperature or in a heated state, (2) a method of performing a polymerization treatment such as ultraviolet curing or thermal curing with respect to the electrolytic solution containing the polymeric material present as a polymeric gelling agent, and (3) a method in which a material obtained by melting the polymeric material in the electrolytic solution at a high temperature is cooled to normal temperature, and the like. In a case of using the method (2) or (3), the electrolytic solution is further injected after forming the non-fluidic electrolyte layer, and thus it is possible to realize the battery configuration of the present disclosure, in which both of the non-fluidic electrolyte and the fluidic electrolyte are present.

In addition, details of the method of forming the non-fluidic electrolyte layer will be described later in combination with a method of manufacturing the battery.

In a case of using the method (1) of impregnating electrolyte into the polymeric material at normal temperature or in a heated state, as the polymeric material, a material that absorbs a solvent and gels is possible. Examples of the polymeric material include a fluorine-based polymeric material such as a copolymer containing polyvinylidene fluoride or vinylidene fluoride, and hexafluoropropylene as a component; an ether-based polymeric material such as a polyethylene oxide and a cross-linking body containing polyethylene oxide; an alkylene oxide-based polymeric material having an alkylene oxide unit; a polymeric material containing polyacrylonitrile, polypropylene oxide, or polymethyl methacrylate as a repetitive unit; and the like. One kind of these polymeric materials may be used alone, or two or more kinds thereof may be mixed and used.

Particularly, from a viewpoint of redox stability, the fluorine-based polymeric materials are preferable, and among these, polyvinylidene fluoride is preferable. This is because in a process of non-fluidization with the electrolytic solution, swelling or dissolution is not likely to occur, the polyvinylidene fluoride is advantageous for localization of the non-fluidic electrolyte layer, and the polyvinylidene fluoride is strongly adhered to the positive electrode or the negative electrode after the non-fluidization of the electrolytic solution and thus a battery shape may be maintained. From the same viewpoint, a weight-average molecular weight of the polymeric material is preferably 500,000 or more.

In addition, the weight-average molecular weight of the polymeric material may be measured by, for example, a gel permeation chromatography (GPC) method, a viscoelasticity measuring method, a melt flow rate (MFR) measuring method, an optical scattering method, and a sedimentation velocity method, and the like.

Furthermore, the copolymer may contain a monoester of an unsaturated dibasic acid such as monomethyl maleic acid ester, a halogenated ethylene such as ethylene trifluoride chloride, a cyclic carbonate ester of an unsaturated compound such as vinylene carbonate, an epoxy group-containing acrylic vinyl monomer, or the like as a component. This is because relatively superior characteristics may be obtained.

In a case of using the method (2) of performing a polymerization treatment such as ultraviolet curing or thermal curing with respect to the electrolytic solution containing the polymeric material present as a polymeric gelling agent, examples of the polymeric gelling agent include compounds having an unsaturated double bond such as an acryloyl group, a methacryloyl group, a vinyl group, and an allyl group. Specifically, examples of the polymeric gelling agent include acrylic acid, methyl acrylate, ethyl acrylate, ethoxyethyl acrylate, methoxyethyl acrylate, ethoxyethoxyethyl acrylate, polyethylene glycol monoacrylate, ethoxyethyl methacrylate, methoxyethyl methacrylate, ethoxyethoxyethyl methacrylate, polyethylene glycol monomethacrylate, N,N-diethylaminoethyl acrylate, N,N-dimethylaminoethyl acrylate, glycidyl acrylate, allyl acrylate, acrylonitrile, N-vinylpyrrolidone, diethylene glycol diacrylate, triethylene glycol diacrylate, tetraethylene glycol diacrylate, polyethylene glycol diacrylate, diethylene glycol dimethacrylate, triethylene glycol dimethacrylate, tetraethylene glycol dimethacrylate, polyethylene glycol dimethacrylate, polyalkylene glycol diacrylate, polyalkylene glycol dimethacrylate, and the like. Furthermore, examples of the polymeric gelling agent include trifunctional monomers such as trimethylolpropane alkoxylate triacrylate and pentaerythritol alkoxylate triacrylate, and tetrafunctional or multi-functional monomers such as pentaerythritol alkoxylate tetraacrylate and ditrimethylolpropane alkoxylate tetraacrylate. Among these, an oxyalkylene glycol-based compound having an acryloyl group or a methacryloyl group is preferable. Any one kind of the polymeric gelling agents may be used alone, or two or more kinds thereof may be mixed and used.

A weight-average molecular weight of the polymeric material generated from the polymeric gelling agent is preferably 500,000 or more. This is because the larger the weight-average molecular weight is, the further the electrolytic solution has a tendency to be non-fluidized, and even when being thin, a non-fluidic electrolyte layer having a high adhesion strength with respect to the positive electrode or the negative electrode and the separator may be formed.

In a case of using the method (3) in which a material obtained by dissolving the polymeric material in the electrolytic solution at a high temperature is cooled to normal temperature, any polymer compound may be used as long as it forms a gel with respect to the electrolytic solution as a polymeric material and is stable as a battery material. Specifically, examples of the polymer compound include polymers having a ring such as polyvinylpyridine and poly-N-vinylpyrrolidone; acrylate derivative-based polymers such as polymethylmethacrylate, polyethylmethacrylate, polybutylmethacrylate, polymethylacrylate, polyethylacrylate, polyacrylic acid, polymethacrylic acid and polyacrylamide; fluorine-based resins such as polyvinyl fluoride and polyvinylidene fluoride; CN group-containing polymers such as polyacrylonitrile and polyvinylidene cyanide; polyvinyl alcohol-based polymers such as polyvinyl acetate and polyvinyl alcohol; halogen-containing polymers such as polyvinyl chloride and polyvinylidene chloride; and the like. Any one kind of the polymeric materials may be used alone, or two or more kinds thereof may be mixed and used. In addition, modified compounds, derivatives, random copolymers, alternating copolymers, graft copolymers, block copolymers of the polymeric materials, or the like may be used.

A weight-average of molecular weight of these polymeric materials is preferably 500,000 or more. This is because the larger the weight-average molecular weight is, the further the electrolytic solution has a tendency to be non-fluidized, and even when being thin, a non-fluidic electrolyte layer having a high adhesion strength with the positive electrode or the negative electrode and the separator may be formed.

Effect

When the electrolyte of the first embodiment is used with respect to a battery, the battery characteristics during a use for a long-period of time or during a use in a high-temperature environment or in a low-temperature environment may be improved.

That is, in the present disclosure, both of the fluidic electrolyte in which the electrolytic solution is present while maintaining fluidity, and the non-fluidic electrolyte in which the electrolytic solution is supported by the polymeric material are present in the battery. Therefore, adhesiveness between the positive electrode and the negative electrode increases due to the non-fluidic electrolyte, and the high ion conductivity may be maintained due to the fluidic electrolyte. In addition, when the imide salt compound is used as the electrolyte salt, decomposition of the electrolyte salt during charging and discharging or during being stored in a high-temperature environment may be suppressed. In addition, since a non-fluidization treatment at a high temperature may be performed during formation of the non-fluidic electrolyte, a non-fluidic electrolyte layer having relatively high adhesiveness may be formed. In addition, when the imide salt compound is used as the electrolyte salt, a decrease in battery characteristic in a low-temperature environment may be suppressed.

2. Second Embodiment

In this second embodiment, a configuration example of the battery using the electrolyte of the first embodiment will be described.

(2-1) First Configuration of Battery

Figure 2A:
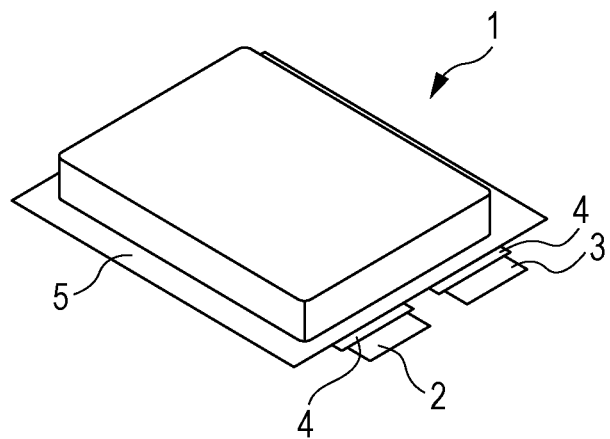
FIGS. 2A to 2C are exterior perspective views and an exploded perspective view illustrating a configuration a laminated film type battery using a laminated electrode body according to a first embodiment of the present disclosure.
Figure 2B:
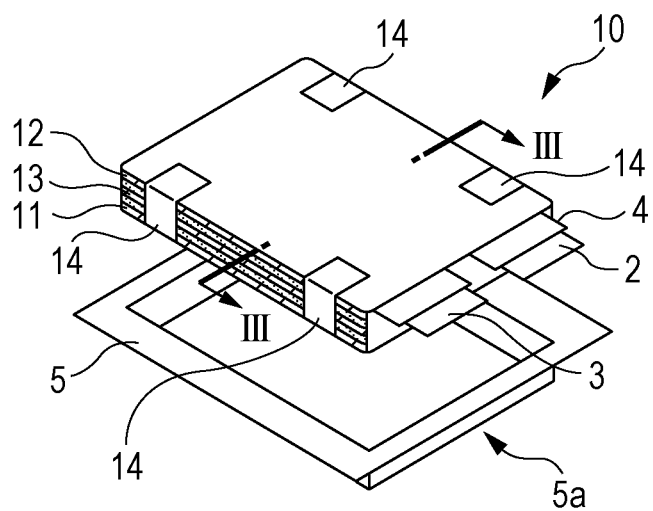
Figure 2C:
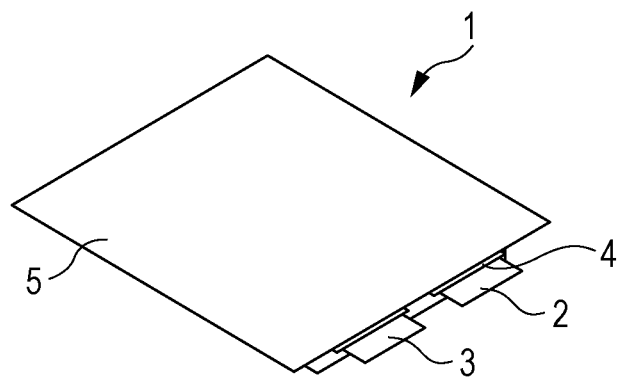
Figure 3:
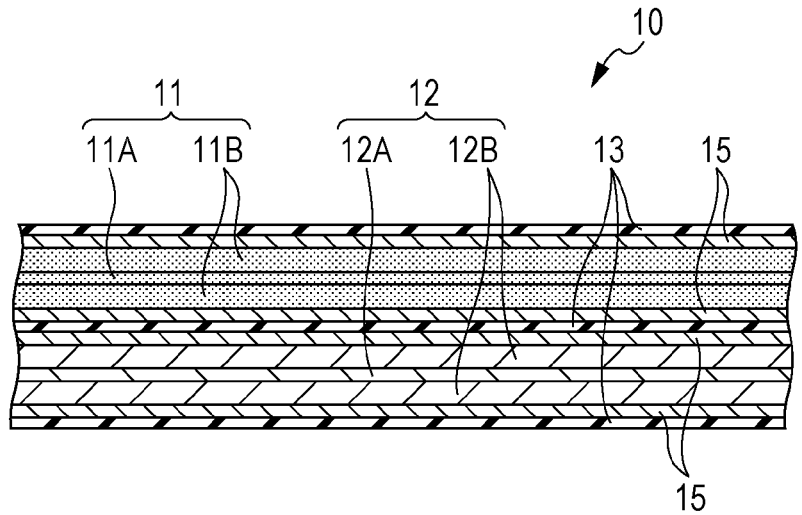
FIG. 3 is a cross-sectional view illustrating a part of the laminated electrode body, which is accommodated in the battery shown in FIG. 2B, in an enlarged manner.

A first configuration of the battery of the second embodiment is a so-called laminated film type battery in which a laminated electrode body obtained by laminating electrodes is packaged by a laminated film. FIG. 2A shows an exterior perspective view seen from one main surface side of the battery 1 according to the second embodiment of the present disclosure, FIG. 2B shows an exploded perspective view seen from the other main surface side of the battery 1, and FIG. 2C shows an exterior perspective view seen from the other main surface side of the battery 1. FIG. 3 shows a cross-sectional view illustrating a part of the laminated structure along a line III-III of the laminated electrode body 10 shown in FIG. 2B in an enlarged manner.

In this battery, the laminated electrode body 10, to which a positive electrode lead 2 and a negative electrode lead 3 are attached, is mainly packaged by a film-shaped exterior packaging member 5. As shown in FIG. 2B, the laminated electrode body 10, which is accommodated in the battery 1, has a configuration in which a rectangular positive electrode 11 and a rectangular negative electrode 12 are laminated with a separator 13 interposed therebetween, the outermost circumferential portion is protected by a fixing member 14 that is fixed thereto with a protective tape. In addition, a non-fluidic electrolyte layer 15 is formed between the separator 13, and the positive electrode 11 and between the separator 13 and the negative electrode 12, respectively. The non-fluidic electrolyte layer 15 is, for example, a gelatinous layer in which an electrolytic solution is supported by a polymeric material. A battery structure using this film-shaped exterior packaging member 5 is referred to as a laminated film type.

The positive electrode lead 2 and the negative electrode lead 3 lead out from the inside of the battery 1 packaged, for example, with the exterior packaging member 5 to the outside. The positive electrode lead 2 is formed from, for example, a metallic material such as aluminum, and the negative electrode lead 3 is formed from, for example, a metallic material such as copper, nickel, and stainless steel. These metallic materials are formed, for example, in a thin plate shape or a network shape.

Exterior Packaging Member

The exterior packaging member 5 is, for example, a laminated film that is obtained by forming a resin layer on both surfaces of a metallic layer. In the laminated film, an outer side resin layer is formed on a surface, which is exposed to the outside of the battery, of the metallic layer, and an inner side resin layer is formed on a battery inner side surface, which is opposite to a power generating element such as the laminated electrode body 10, of the metallic layer.

The metallic layer has an important function of blocking entrance of moisture, oxygen, and light to protect the contents, and aluminum (Al) is frequently used to form the metallic layer from the viewpoints of lightness, extensibility, price, and processing easiness. The outer side resin layer has beauty in exterior appearance, toughness, flexibility, and the like, and a resin material such as nylon or polyethylene terephthalate (PET) is used to form the outer side resin layer. The inner side resin layer is a portion to be melted and fused with heat or ultrasonic waves, and thus polyolefin is preferable for the inner side resin layer, and casted polypropylene (CPP) is frequently used. An adhesive layer may be provided between the metallic layer and the outer side resin layer and between the metallic layer and the inner side resin layer, respectively, according to necessity.

In the exterior packaging member 5, a concave portion 5a, which is formed, for example, by performing deep drawing in a direction toward the outer side resin layer from the inner side resin layer and accommodates the laminated electrode body 10, is provided, and the inner side resin layer is disposed to be opposite to the laminated electrode body 10. Inner side resin layers, which are opposite to each other, of exterior packaging member 5 are brought into close contact with each other at outer edge portions of the concave portion 5a by fusion or the like. An adhesion film 4, which improves adhesiveness between the inner side resin layer of the exterior packaging member 5 and the positive electrode lead 2 and the negative electrode lead 3 that are formed from a metallic material, is disposed between the exterior packaging member 5 and the positive electrode lead 2 and between the exterior packaging member 5 and the negative electrode lead 3, respectively. The adhesion film 4 is formed from a resin material having a high adhesiveness with a metallic material. For example, the adhesion film 4 is formed from a polyolefin-based resin such as polyethylene, polypropylene, and modified polyethylene or modified polypropylene that is modified from the polyethylene and the polypropylene.

In addition, instead of an aluminum laminated film in which the metallic layer is formed from aluminum (Al), the exterior packaging member 5 may be formed from a laminated film having a different structure, a polymeric film such as polypropylene, or a metallic film.

The adhesion film 4, which prevents entrance of ambient air or moisture, is inserted between the exterior packaging member 5 and the positive electrode lead 2 and between the exterior packaging member 5 and the negative electrode lead 3, respectively. The adhesion film 4 is formed from a material having adhesiveness with respect to the positive electrode lead 2 and the negative electrode lead 3. Examples of this material include polyolefin resins such as polyethylene, polypropylene, modified polyethylene, and modified polypropylene.

Electrolyte

As shown in FIG. 3, a non-fluidic electrolyte layer 15 is formed, for example, between the separator 13 and the positive electrode 11 and between the separator 13 and the negative electrode 12, respectively. In addition, an electrolytic solution (not shown) is injected into the battery 1, and thus a fluidic electrolyte is present together with the non-fluidic electrolyte layer 15. The non-fluidic electrolyte layer 15 and the fluidic electrolyte are the same as those in the first embodiment.

In addition, without using the separator 13, the non-fluidic electrolyte layer 15 may be used instead of the separator 13 that insulates the positive electrode 11 and the negative electrode 12 and prevents physical contact between the positive electrode 11 and the negative electrode 12. In this case, the non-fluidic electrolyte layer 15 is disposed between the positive electrode 11 and the negative electrode 12.

Positive Electrode

Figure 4A:
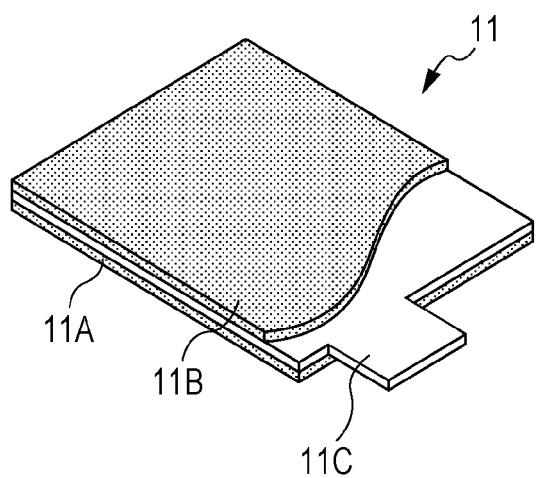
FIGS. 4A and 4B are perspective views illustrating a positive electrode and a negative electrode that are used in the laminated electrode body accommodated in the battery illustrated in FIG. 2B.

For example, each positive electrode 11 has a configuration in which a positive electrode active material layer 11B is provided on both surfaces of a positive electrode current collector 11A having a pair of opposite surfaces, respectively. The positive electrode current collector 11A is formed from, for example, metallic foil such as aluminum foil. As shown in FIG. 4A, each positive electrode tab 11C, which is connected to the positive electrode lead 2, continuously extends from the positive electrode current collector 11A. Plural sheets of the positive electrode tabs 11C, which extend from a plurality of the positive electrodes 11 that are laminated, are fixed to each other and the positive electrode current collector 11A is connected thereto. In addition, in FIG. 4A, so as to clarify the configuration of the positive electrode tab 11C, the positive electrode active material layer 11B is shown in a state in which a part thereof is not formed. However, actually, the positive electrode active material layer 11B is formed at a portion other than a portion of the positive electrode tab 11C.

The positive electrode active material layer 11B contains, for example, a positive electrode active material, a conductive material, and a binding material. The positive electrode active material layer 11B contains any one or more kinds of positive electrode materials, which are capable of occluding and emitting lithium ions, as the positive electrode active material, and may contain other materials such as a binding material and a conductive material according to necessity.

Appropriate examples of the positive electrode material, which is capable of occluding and emitting lithium ions, include lithium-containing compounds such as lithium oxide, lithium phosphorous oxide, lithium sulfide, and interlayer compound containing lithium, and two or more kinds thereof may be mixed and used. So as to increase energy density, lithium-containing compounds including lithium, a transition metal element, and oxygen (O) are preferable. Examples of these lithium-containing compounds include lithium composite phosphate having an olivine type structure expressed by Chem. I, layered rock-salt type structure expressed by Chem. II, and the like. As the lithium-containing compound, compounds containing at least one kind selected from a group consisting of cobalt (Co), nickel (Ni), manganese (Mn), and iron (Fe) as a transition metal element are more preferable. Examples of these lithium-containing compounds include lithium composite phosphate having an olivine type structure expressed by Chem. III, lithium composite oxide having a layered rock-salt type structure expressed by Chem. IV, Chem. V, or Chem. VI, lithium composite oxide having a spinel type structure expressed by Chem. VII, and the like. Specifically, examples of these lithium-containing compounds include $LiNi_{0.50}Co_{0.20}Mn_{0.30}O_2$, $Li_aCoO_2$ (a≅1), $Li_bNiO_2$ (b≅1), $Li_{c1}Ni_{c2}Co_{1-c2}O_2$ (c1≅1, 0<c2<1), $Li_dMn_2O_4$ (d≅1), $Li_eFePO_4$ (e≅1), and the like.

$$Li_aM1_bPO_4 \quad \text{(Chem. I)}$$

(Here, M1 represents at least one kind of element selected from elements of group II to group XV, and a and b represent values within ranges of 0≤a≤2.0 and 0.5≤b≤2.0.)

$$Li_cNi_{(1-d-e)}Mn_dM2_eO_{(1-f)}X_g \quad \text{(Chem. II)}$$

(Here, M2 represents at least one kind of element selected from elements (excepting nickel (Ni) and manganese (Mn)) of group II to group XV. X represents at least one kind of element selected from elements (excepting oxygen (O)) of group XVI and group XVII. c, d, e, f, and g represent values within ranges of 0≤c≤1.5, 0≤d≤1.0, 0≤e≤1.0, −0.10≤f≤0.20, and 0≤g≤0.2.)

$$Li_hM3PO_4 \quad \text{(Chem. III)}$$

(Here, M3 represents at least one kind selected from a group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). h represents a value within a range of 0.9≤h≤1.1. In addition, the composition of lithium is different depending on the charge and discharge state, and the value of z represents a value in a completely discharged state.)

$$Li_iMn_{(i-j-k)}Ni_jM4_kO_{(1-m)}F_n \quad \text{(Chem. IV)}$$

(Here, M4 represents at least one kind selected from a group consisting of cobalt (Co), magnesium (Mg), aluminum (Al), boron (B), titanium (Ti), vanadium (V), chrome (Cr), iron (Fe), copper (Cu), zinc (Zn), zirconium (Zr), molybdenum (Mo), tin (Sn), calcium (Ca), strontium (Sr), and tungsten (W). i, j, k, m, and n represent values within ranges of 0.8≤i≤1.2, 0<j<0.5, 0≤k≤0.5, j+k<1, −0.1≤m≤0.2, and 0≤n≤0.1. In addition, the composition of lithium is different depending on the charge and discharge state, and the value of i represents a value in a completely discharged state.)

$$Li_oNi_{(i-p)}M5_pO_{(1-q)}F_r \quad \text{(Chem. V)}$$

(Here, M5 represents at least one kind selected from a group consisting of cobalt (Co), manganese (Mn), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W). o, p, q, and r represent values within ranges of 0.8≤o≤1.2, 0.005≤p≤0.5, −0.1≤q≤0.2, 0≤r≤0.1. In addition, the composition of lithium is different depending on a charge and discharge state, and the value of o represents a value in a completely discharged state.)

$$Li_sCo_{(1-t)}M6_tO_{(1-u)}F_v \quad \text{(Chem. VI)}$$

(Here, M6 represents at least one kind selected from a group consisting of nickel (Ni), manganese (Mn), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W). s, t, u, and v represent values within ranges of 0.8≤s≤1.2, 0≤t<0.5, −0.1≤u≤0.2, 0≤v≤0.1. In addition, a composition of lithium is different depending on a charge and discharge state, and a value of s represents a value in a completely discharged state.)

$$Li_wMn_{(1-x)}M7_xO_yF_z \quad \text{(Chem. VII)}$$

(Here, M7 represents at least one kind selected from a group consisting of cobalt (Co), nickel (Ni), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W). w, x, y, and z represent values within ranges of 0.9≤w≤1.1, 0≤x≤0.6, 3.7≤y≤4.1, and 0≤g≤0.1. In addition, a composition of lithium is different depending on a charge and discharge state, and a value of w represents a value in a completely discharged state.)

Among these, it is preferable to use lithium composite phosphate having an olivine type structure expressed by Chem. I and Chem. III as the positive electrode active material. Particularly, as M1 in Chem. I and M3 in Chem. III, iron (Fe) is preferably included. As the content of iron (Fe) is larger, it is more preferable. This is because when the electrolyte including both of the non-fluidic electrolyte and the fluidic electrolyte of the present disclosure is used, relatively superior battery characteristics may be obtained.

Furthermore, from the viewpoints of obtaining relatively high electrode filling property and cycle characteristic, a composite particle, in which a surface of a core particle formed from any one of the above-described lithium-containing compounds is coated with a fine particle formed from any one of other lithium-containing compounds or a carbon material, may be used.

In addition, examples of the positive electrode material capable of occluding and emitting lithium ions include oxide, disulfide, chalcogenide, conductive polymer, and the like. Examples of the oxide include vanadium oxide ($V_2O_5$), titanium dioxide ($TiO_2$), manganese dioxide ($MnO_2$), and the like. Examples of the disulfide include iron disulfide ($FeS_2$), titanium disulfide ($TiS_2$), molybdenum disulfide ($MoS_2$), and the like. As the chalcogenide, a layered compound or a spinel type compound is particularly preferable, and examples thereof include niobium selenide ($NbSe_2$) and the like. Examples of the conductive polymer include sulfur, polyaniline, polythiophene, polyacetylene, polypyrrole, and the like. The positive electrode material may be another material other than the above-described materials. In addition, two or more kinds of the above-described positive electrode materials may be mixed in an arbitrary combination.

A specific surface area of the positive electrode active material is set to be 0.05 to 2.0 m²/g in measurement according to a BET (Brunauer, Emmett, Teller) method in a case of using nitrogen ($N_2$) as an absorption gas, and preferably 0.2 to 0.7 m²/g. This is because a relatively effective charge and discharge characteristic may be obtained within this range.

In addition, as the conductive material, for example, a carbon material such as carbon black and graphite is used. As the binding material, for example, at least one kind selected from resin materials such as polyvinylidene fluoride (PVdF), polytetrafluoroethylene (PTFE), polyacrylonitrile (PAN), styrene butadiene rubber (SBR), and carboxymethyl cellulose (CMC), and copolymers containing these resin materials as a main component.

Negative Electrode

Figure 4B:
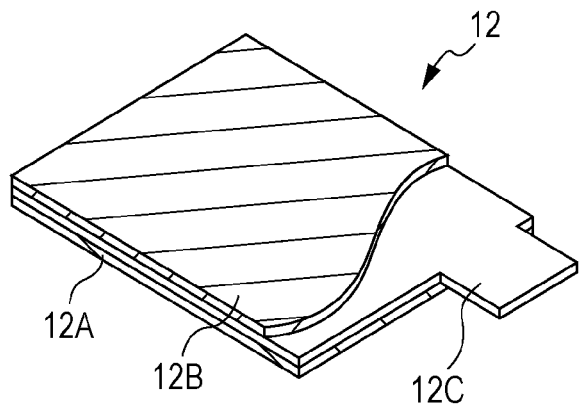

For example, the negative electrode has a configuration in which a negative electrode active material layer 12B is provided on both surfaces of a negative electrode current collector 12A having a pair of opposite surfaces, respectively. The negative electrode current collector 12A is formed from, for example, metallic foil such as copper foil. As shown in FIG. 4B, each negative electrode tab 12C, which is connected to the negative electrode lead 3, continuously extends from the negative electrode current collector 12A. Plural sheets of the negative electrode tabs 12C, which extend from a plurality of the negative electrodes 12 that are laminated, are fixed to each other and the negative electrode current collector 12A is connected thereto. In addition, in FIG. 4B, so as to clarify the configuration of the negative electrode tab 12C, the negative electrode active material layer 12B is shown in a state in which a part thereof is not formed. However, actually, the negative electrode active material layer 12B is formed at a portion excepting a portion of the negative electrode tab 12C.

The negative electrode active material layer 12B contains any one or more kinds of negative electrode materials, which are capable of occluding and emitting lithium ions, as a negative electrode active material, and may contain other materials such as a binding material and a conductive material similarly to the positive electrode active material layer 11B, according to necessity.

In addition, in the battery 1, an electrochemical equivalent of the negative electrode material capable of occluding and emitting lithium ions is larger than that of the positive electrode 11, and is theoretically set in order for a lithium metal not to precipitate to the negative electrode 12 during charging.

Examples of the negative electrode material capable of occluding and emitting include carbon materials such as a non-graphitization carbon, easy-graphitization carbon, graphite, pyrolytic carbons, cokes, glassy carbons, a baked body of an organic polymeric material, carbon fiber, and activated charcoal. Among these, examples of the cokes include pitch coke, needle coke, petroleum coke, and the like. The baked body of an organic polymeric material represents a carbonized material that is obtained by baking polymeric material such as a phenol resin or a furan resin at an appropriate high temperature, and may be classified into non-graphitization carbon or easy-graphitization carbon in some parts. These carbon materials are preferable because a change in the crystal structure, which occurs during charging and discharging, is very small, and a high charging and discharging capacity may be obtained, and a satisfactory cycle characteristic may be obtained. Particularly, graphite is preferable because an electrochemical equivalent may be large and a high energy density may be obtained. In addition, non-graphitization carbon is preferable because a superior cycle characteristic may be obtained. Furthermore, a material of which charge and discharge electric potential is low, specifically, a material of which charge and discharge electric potential is close to that of a lithium metal is preferable because high energy density of the battery may be easily realized.

As the negative electrode material capable of occluding and emitting lithium ions, a material, which is capable of occluding and emitting lithium ions and contains at least one kind of a metallic element and a metalloid element, may be exemplified. This is because a high energy density may be obtained when this material is used. Particularly, it is more preferable to use this material in combination with a carbon material because a high energy density and a superior cycle characteristic may be obtained. The negative electrode material may be an elementary metallic element or metalloid element, an alloy thereof, or a compound thereof, and the negative electrode material may at least partially have one or more kinds of phases thereof. In addition, in the present disclosure, in addition to an alloy of two or more kinds of metallic elements, the term "alloy" also includes an alloy containing one or more kinds of metallic elements and one or more kinds of metalloid elements. In addition, the alloy may contain a nonmetallic element. The texture of the alloy includes a solid solution, a eutectic crystal (a eutectic mixture), an intermetallic compound, and a texture in which two or more kinds of these textures coexist.

Examples of the metal elements or the metalloid elements, which make up the negative electrode material, include metal elements or metalloid elements that are capable of forming an alloy with lithium. Specifically, examples of the metal elements or the metalloid elements include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt), and the like. These may be crystalline materials or amorphous materials.

As the negative electrode material, for example, materials containing a metallic element or a metalloid element of group 4B in a short-period type periodic table as a constituent element are preferable, materials containing at least one of silicon (Si) and tin (Sn) as a constituent element are more preferable, and materials containing at least silicon is still more preferable. This is because silicon (Si) and tin (Sn) have large capacity of occluding and emitting lithium ions and may obtain a high energy density. Examples of the negative electrode material, which contains at least one kind of silicon and tin, include elementary silicon, alloys or compounds of silicon, elementary tin, alloys or compounds of tin, and materials that at least partially have one or more kinds of these.

Examples of the alloys of silicon include alloys containing, as a secondary constituent element other than silicon, at least one kind selected from a group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloys of tin include alloys containing, a secondary constituent element other than tin (Sn), at least one kind selected from a group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compounds of tin (Sn) or silicon (Si) include compounds containing oxygen (O) or carbon (C). Furthermore, the tin or silicon compounds may contain the above-described secondary constituent element in addition to tin (Sn) or silicon (Sn).

Among these, as the negative electrode material, a SnCoC-containing material, which contains cobalt (Co), tin (Sn), and carbon (C) as a constituent element, and in which a content of carbon is 9.9 to 29.7 mass %, a ratio of cobalt (Co) on the basis of a sum of tin (Sn) and cobalt (Co) is 30 to 70 mass %, is preferable. This is because a high energy density and a superior cycle characteristic may be obtained in this compositional range.

This SnCoC-containing material may further contain another constituent element according to necessity. As another constituent element, for example, silicon (Si), iron (Fe), nickel (Ni), chrome (Cr), indium (In), niobium (Nb), germanium (Ge), titanium (Ti), molybdenum (Mo), aluminum (Al), phosphorus (P), gallium (Ga), or bismuth (Bi) is preferable, and the SnCoC-containing material may contain two or more kinds of these constituent elements. This is because the capacity or cycle characteristic may be further improved.

In addition, the SnCoC-containing material has a phase including tin (Sn), cobalt (Co), and carbon (C), and it is preferable that this phase have a low crystalline or amorphous structure. In addition, in the SnCoC-containing material, it is preferable that at least part of carbon (C) present as a constituent element be bonded to a metallic element or a metalloid element present as another constituent element. A decrease in cycle characteristic is considered to be due to aggregation or crystallization of tin (Sn) or the like, but when carbon (C) is bonded to another element, the aggregation or crystallization may be suppressed.

Examples of the measurement method of examining the bonding state of the element include X-ray photoelectron spectroscopy (XPS). In the XPS, in a case of graphite, a peak of the 1s orbital (C1s) of carbon is shown at 284.5 eV in a device having undergone an energy calibration such that a peak of the 4f orbital (Au4f) of a gold atom is obtained at 84.0 eV. In addition, in a case of surface-contaminated carbon, the peak is shown at 284.8 eV. On the other hand, in a case where the charge density of the carbon atom increases, for example, in a case where carbon is bonded to the metallic element or the metalloid element, the C1s peak is shown in a range below 284.5 eV. That is, in a case where a peak of a synthetic wave of C1s, which is obtained for the SnCoC-containing material, is shown at a range below 284.5 eV, at least part of the carbon contained in the SnCoC-containing material is in a state of being bonded to the metallic element or the metalloid element present as another constituent element.

In addition, in the XPS measurement, for example, the C1s peak is used for calibration of an energy axis of spectrum. Normally, surface-contaminated carbon is present at the surface of the SnCoC-containing material, and thus the C1s peak of the surface-contaminated carbon is set to 284.8 eV, and this is used as an energy reference. In the XPS measurement, a waveform of the C1s peak is obtained as a waveform that contains both of the peak of the surface-contaminated carbon and the peak of the carbon in the SnCoC-containing material. Therefore, the peak of the surface-contaminated carbon and the peak of the carbon in the SnCoC-containing material are separated from each other, for example, by an analysis conducted using commercially available software. In the waveform analysis, the position of a main peak present on the minimum binding energy side is used as an energy reference (284.8 eV).

Furthermore, examples of the negative electrode material, which may occlude and emit lithium ions, further include other metallic compounds and polymeric materials. Examples of other metallic compounds include oxides such as lithium titanate ($Li_4Ti_5O_{12}$), manganese dioxide ($MnO_2$), and vanadium oxide ($V_2O_5$, $V_6O_{13}$), sulfides such as nickel sulfide (NiS) and molybdenum sulfide ($MoS_2$), and lithium nitrides such as lithium nitride ($Li_3N$). Examples of the polymeric materials include polyacetylene, polyaniline, polypyrrole, and the like.

Separator

The separator 13 is a component that isolates the positive electrode 11 and the negative electrode 12 from each other to prevent short-circuiting due to mutual contact of the electrodes, and allows lithium ions to pass therethrough. The separator 13 is formed from, for example, a porous membrane of a synthetic resin such as polytetrafluoroethylene, polypropylene, and polyethylene, or a porous membrane of a ceramic, and may have a structure in which two or more kinds of the porous membranes are laminated. The separator 13 is impregnated with the non-fluidic electrolyte.

The separator 13 may contain any one of polypropylene (PP), polyvinylidene fluoride (PVdF), and polytetrafluoroethylene (PTFE) in addition to polyethylene. In addition, the separator 13 may be configured by the ceramic porous membrane and various kinds of polyethylene (PE), polypropylene (PP), and polytetrafluoroethylene (PTFE) may be mixed to the ceramic porous membrane. Furthermore, polyvinylidene fluoride (PVdF) may be applied or deposited onto the surface of a porous membrane of polyethylene (PE), polypropylene (PP), and polytetrafluoroethylene (PTFE). In a case where polyvinylidene fluoride (PVdF) is applied onto the surface of the porous membrane, inorganic particles such as alumina ($Al_2O_3$) and silica ($SiO_2$) may be mixed to the polyvinylidene fluoride (PVdF).

In addition, the separator 13 may have a structure in which two or more kinds of porous membranes of polyethylene (PE), polypropylene (PP), and polytetrafluoroethylene (PTFE) are laminated. A porous membrane of polyolefin is preferable from the viewpoints that the short-circuit prevention effect is superior and the stability of a battery due to the shut-down effect is realized.

(2-2) Second Configuration of Battery

A second configuration of the battery of the second embodiment is a laminated film type battery in which instead of the laminated electrode body, strip-shaped electrodes are laminated and are wound to obtain a wound electrode body, and then the wound electrode body is packaged with a laminated film.

Figure 5:
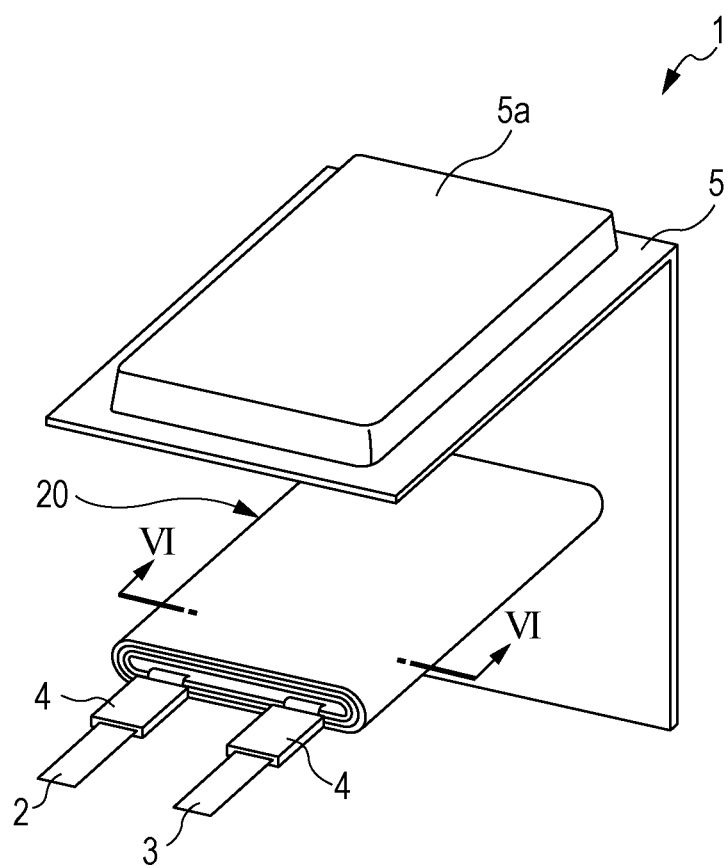
FIG. 5 is an exploded perspective view illustrating a configuration of a laminated film type battery using a wound electrode body according to the second embodiment of the present disclosure.
Figure 6:
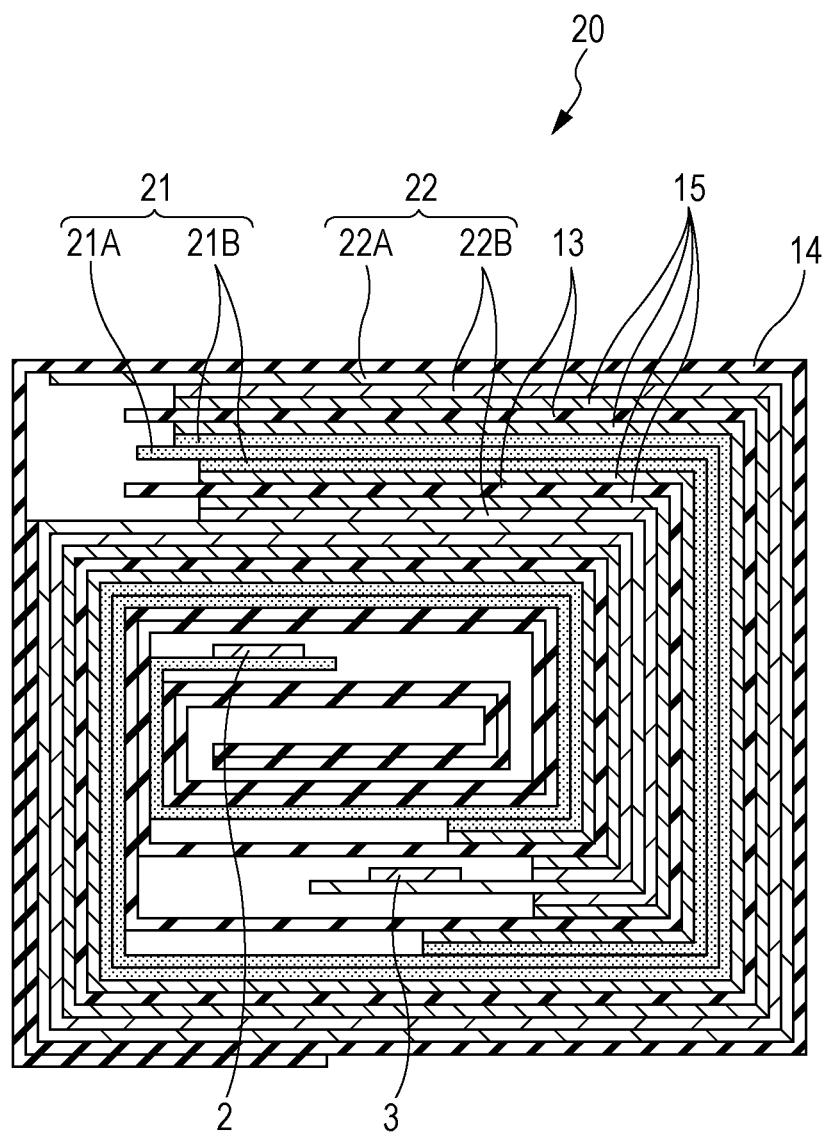
FIG. 6 is a cross-sectional view illustrating the wound electrode body accommodated in the battery illustrated in FIG. 5.

FIG. 5 is an exploded perspective view illustrating a second configuration example of the battery 1 according to the second embodiment of the present disclosure, and FIG. 6 is a view illustrating the cross-sectional structure of a wound electrode body 20 along a line VI-VI in FIG. 5. The battery 1 of the second configuration is the same as the battery 1 of the first configuration except that the electrode body is made to have a wound structure, and thus the same reference numerals will be given to common portions.

The wound electrode body 20 is formed by laminating strip-shaped positive electrode and negative electrode 21 and 22 through a separator 13 and a non-fluidic electrolyte layer 15 and by winding the resultant laminated body, and a winding distal end portion is fixed by a fixing member 14 according to necessity. The non-fluidic electrolyte layer 15 and a fluidic electrolyte (not shown) are present inside the battery 1.

(2-3) Method of Manufacturing Battery

The battery 1 of the second embodiment is manufactured, for example, by the following three kinds of manufacturing methods (first to third manufacturing methods).

(2-3-1) First Manufacturing Method

In the first manufacturing method, description will be made with respect to the method (1) of impregnating the electrolytic solution into the polymeric material such as polyvinylidene fluoride at normal temperature or while being heated, which is described in the first embodiment.

Manufacturing of Positive Electrode

First, a positive electrode 11 is prepared. For example, a positive electrode material, a binding material, and a conductive material are mixed to form a positive electrode mixture, and then the positive electrode mixture is dispersed in an organic solvent to form paste-like positive electrode mixture slurry. Subsequently, the positive electrode mixture slurry is uniformly applied to both surfaces of a positive electrode current collector 11A by using a doctor blade, a bar coater, or the like, and is dried. Finally, a coated film is compression-molded by using a roll pressing machine or the like while heating the coated film according to necessity to form a positive electrode active material layer 11B. In this case, the compression molding may be repeated plural times.

Manufacturing of Negative Electrode

Next, a negative electrode 12 is prepared. For example, a negative electrode material, a binding material, and a conductive material according to necessity are mixed to form a negative electrode mixture, and then the negative electrode mixture is dispersed in an organic solvent to form paste-like negative electrode mixture slurry. Subsequently, the negative electrode mixture slurry is uniformly applied to both surfaces of a negative electrode current collector 12A by using a doctor blade, a bar coater, or the like, and is dried. Finally, a coated film is compression-molded by using a roll pressing machine or the like while heating the coated film according to necessity to form a negative electrode active material layer 12B.

Preparation of Electrolytic Solution

A solvent and an electrolyte salt are mixed in a predetermined ratio, whereby an electrolytic solution is prepared.

Next, a polymeric material such as polyvinylidene fluoride (PVdF), which supports the electrolytic solution and forms a non-fluidic electrolyte layer 15, is deposited onto both surfaces of the positive electrode 11 and the negative electrode 12, or both surfaces of a separator 13, respectively. The polymeric material is mixed in a solvent, and is applied or sprayed onto both surfaces of the positive electrode 11 and the negative electrode 12, or both surfaces of the separator 13, and then the solvent is volatilized, whereby the polymeric material is deposited onto the surfaces. At this time, a deposition amount of the polymeric material is set such that both of the non-fluidic electrolyte and the fluidic electrolyte are present after forming the battery from a relationship with an amount of electrolytic solution to be injected later. In addition, it is preferable to set the deposition amount of the polymeric material such that the non-fluidic electrolyte and the fluidic electrolyte have the volume ratio described in the first embodiment after forming the battery. As the polymeric material, the materials described in the first embodiment may be used.

Next, the positive electrode 11 and the negative electrode 12 are laminated through the separator 13, and the fixing member 14 is adhered to the resultant laminated structure so as to fix the laminated structure, whereby a laminated electrode body 10 is manufactured. Subsequently, a positive electrode lead 2 is attached to a portion at which a plurality of the positive electrode tabs 11C extending from a plurality of the positive electrodes 11 are fixed to each other by ultrasonic welding or the like. Similarly, a negative electrode lead 3 is attached to a portion at which a plurality of the negative electrode tabs 12C extending from a plurality of the negative electrodes 12 are fixed to each other by ultrasonic welding or the like.

In a case of manufacturing the wound electrode body 20, the positive electrode lead 2 is attached to the positive electrode 21, and the negative electrode lead 3 is attached to the negative electrode 22. The positive electrode lead 2 is connected to a portion of the positive electrode 21, at which a positive electrode active material layer 21B is not formed and thus a positive electrode current collector 21A is exposed, by ultrasonic welding or the like. Similarly, with respect to the negative electrode lead 3, the negative electrode lead 3 is connected to a portion of the negative electrode 22, at which a negative electrode active material layer 22B is not formed and thus a negative electrode current collector 22A is exposed, by ultrasonic welding or the like. Subsequently, the positive electrode 21 and the negative electrode 22 are laminated through the separator 13 and are wound, and then the fixing member 14 is adhered to an outermost circumferential portion of the resultant wound electrodes, whereby the wound electrode body 20 is manufactured.

Subsequently, the laminated electrode body 10 or the wound electrode body 20 is accommodated in the concave portion 5a that is provided to the exterior packaging member 5, and then the exterior packaging member 5 is thermally fused to form a bag shape. Subsequently, a predetermined amount of electrolytic solution is injected into the bag-shaped exterior packaging member 5, and then an opening of the exterior packaging member 5 is sealed by thermal fusion in a decompressed environment. Finally, the exterior packaging member 5 is heated while applying weight thereto to impregnate the electrolytic solution into the polymeric material, whereby the non-fluidic electrolyte layer 15 is formed. As a result, the battery 1 of the present disclosure may be obtained.

(2-3-2) Second Manufacturing Method

In this second manufacturing method, description will be made with respect to the method (2) of performing a polymerization treatment such as ultraviolet curing or thermal curing with respect to the electrolytic solution containing the polymeric material present as a polymeric gelling agent, which is described in the first embodiment.

First, the positive electrode 11 and the negative electrode 12 are prepared, respectively, similarly to the first manufacturing method. Subsequently, a precursor solution, which contains the electrolytic solution and the polymeric material present as a polymeric gelling agent that are described in the first embodiment, and a polymerization initiator and a polymerization prohibitor according to necessity, is prepared. The precursor solution is applied onto the surface of the positive electrode 11 and the negative electrode 12, and is cured by irradiation of ultraviolet rays or heating, whereby the non-fluidic electrolyte layer 15 is formed.

Subsequently, the laminated electrode body 10 is manufactured by the same method as the first manufacturing method by using the positive electrode 11 and the negative electrode 12 on which the non-fluidic electrolyte layer 15 is formed.

In a case of manufacturing the wound electrode body 20, the positive electrode lead 2 and the negative electrode lead 3 are attached to the positive electrode 21 and the negative electrode 22 on which the non-fluidic electrolyte layer 15 is formed, respectively, and then the wound electrode body 20 is manufactured by the same method as the first manufacturing method.

Finally, the laminated electrode body 10 or the wound electrode body 20 is accommodated in the concave portion 5a that is provided to the exterior packaging member 5, and then the exterior packaging member 5 is thermally fused to form a bag shape. Subsequently, a predetermined amount of electrolytic solution is injected into the bag-shaped exterior packaging member 5, and then an opening of the exterior packaging member 5 is sealed by thermal fusion, for example, in a decompressed environment, whereby the battery 1 of the present disclosure may be obtained. Therefore, both of the non-fluidic electrolyte layer 15 and the fluidic electrolyte are present inside the battery 1. At this time, it is preferable to set an addition amount of the electrolytic solution such that the non-fluidic electrolyte layer 15 that is formed in advance and the fluidic electrolyte have the volume ratio described in the first embodiment.

(2-3-3) Third Manufacturing Method

In this third manufacturing method, description will be made with respect to the method (3) in which a material obtained by dissolving the polymeric material in the electrolytic solution at a high temperature is cooled to normal temperature, which is described in the first embodiment.

First, the positive electrode 11 and the negative electrode 12 are prepared, respectively, similarly to the first manufacturing method. Subsequently, the electrolytic solution, the polymeric material, and the solvent that are described in the first embodiment are dissolved at a high-temperature to prepare a precursor solution, and this precursor solution is applied onto a surface of the positive electrode 11 and the negative electrode 12 and this applied precursor solution is cooled to normal temperature, whereby the non-fluidic electrolyte layer 15 is formed.

Subsequently, the laminated electrode body 10 is manufactured by the same method as the first manufacturing method by using the positive electrode 11 and the negative electrode 12 on which the non-fluidic electrolyte layer 15 is formed. In a case of manufacturing the wound electrode body 20, the positive electrode lead 2 and the negative electrode lead 3 are attached to the positive electrode 21 and the negative electrode 22 on which the non-fluidic electrolyte layer 15 is formed, respectively, and then the wound electrode body 20 is manufactured by the same method as the first manufacturing method.

Finally, the laminated electrode body 10 or the wound electrode body 20 is accommodated in the concave portion 5a that is provided to the exterior packaging member 5, and then the exterior packaging member 5 is thermally fused to form a bag shape. Subsequently, a predetermined amount of electrolytic solution is injected into the bag-shaped exterior packaging member 5, and then an opening of the exterior packaging member 5 is sealed by thermal fusion, for example, in a decompressed environment, whereby the battery 1 of the present disclosure may be obtained. Therefore, both of the non-fluidic electrolyte layer 15 and the fluidic electrolyte are present inside the battery 1. At this time, it is preferable to set an addition amount of the electrolytic solution such that the non-fluidic electrolyte layer 15 that is formed in advance and the fluidic electrolyte have the volume ratio described in the first embodiment.

Effect

In the battery of the second embodiment, superior battery characteristics may be maintained even in a high-temperature environment or a low-temperature environment.

3. Third Embodiment

In this third embodiment, description will be made with respect to another configuration example of the battery using the electrolyte of the first embodiment.

(3-1) First Configuration of Battery

Figure 7:
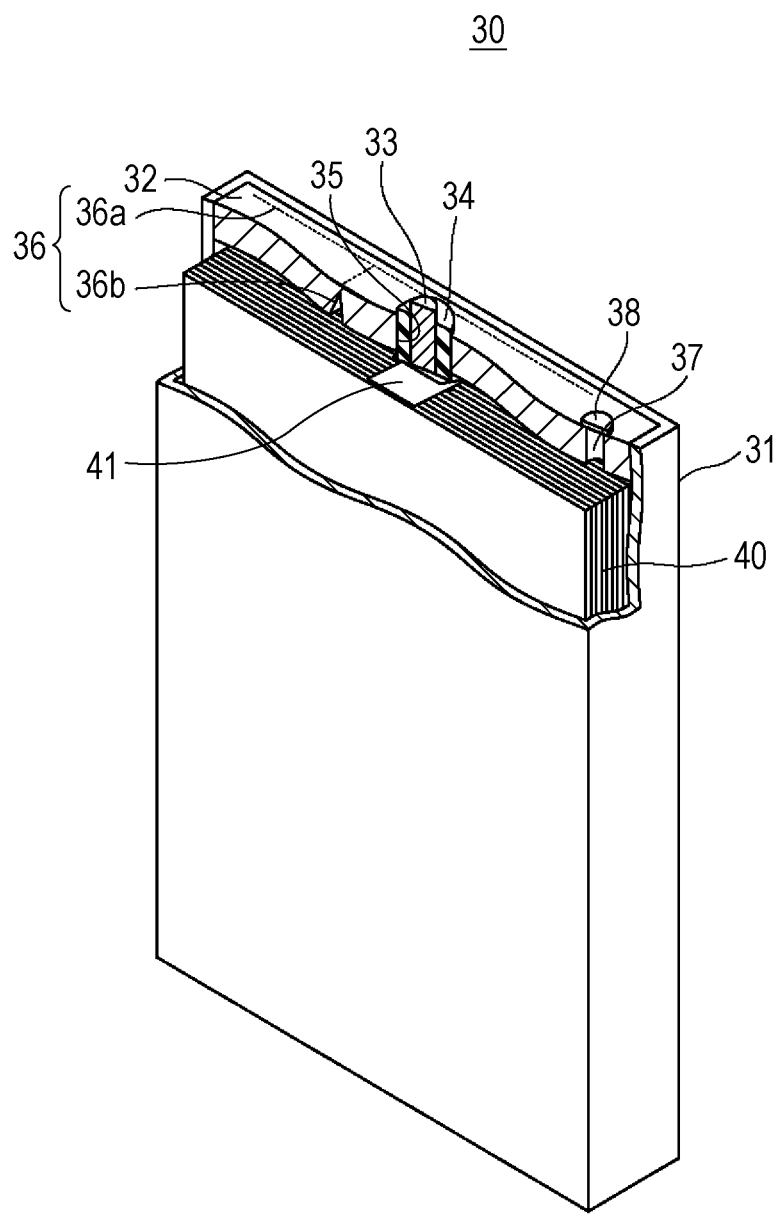
FIG. 7 is a schematic view illustrating a configuration of a square battery according to a third embodiment of the present disclosure.

A first configuration of the battery of the third embodiment is a so-called square battery in which a laminated electrode body obtained by laminating electrodes is inserted to a square exterior casing. FIG. 7 shows a configuration of a square battery 30 according to the third embodiment of the present disclosure. A laminated electrode body 40 is accommodated in a square exterior casing 31. In addition, the square battery 30 may be assembled by using a wound electrode body instead of the laminated electrode body 40.

The square battery 30 includes the square tubular exterior casing 31, the laminated electrode body 40 present as a generator element that is accommodated in the exterior casing 31, a battery lid 32 that closes an opening of the exterior casing 31, an electrode pin 33 that is provided at an approximately central portion of the battery lid 32, and the like.

The exterior casing 31 is formed as a hollow square tubular body having a bottom, for example, with a metal such as iron (Fe) having conductivity. It is preferable that the inner surface of the exterior casing 31 have a configuration in which, for example, nickel plating is performed, or a conductive coating material is applied to increase the conductivity of the exterior casing 31. In addition, an outer circumferential surface of the exterior casing 31 may be covered with an exterior label formed from, for example, a plastic sheet, paper, or the like, or an insulating coating material may be applied thereto so as to protect the exterior casing 31. Similarly to the exterior casing 31, the battery lid 32 may be formed from, for example, a metal such as iron (Fe) having conductivity.

The laminated electrode body 40 has the same configuration as the second embodiment, and may be obtained by laminating a positive electrode and a negative electrode through a separator. Both a non-fluidic electrolyte and a fluidic electrolyte are present between the positive electrode and the separator of the laminated electrode body 40 and between the negative electrode and the separator of the laminated electrode body 40. The positive electrode, the negative electrode, and the separator are the same as those in the first embodiment and the second embodiment, and thus a detailed description thereof will not be repeated.

A positive electrode terminal 41 that is connected a plurality of the positive electrodes and a negative terminal that is connected to a plurality of the negative electrode current collectors are provided to the laminated electrode body 40 having the above-described configuration. The positive electrode terminal 41 and the negative electrode terminal lead out to one end of the laminated electrode body 40 in an axial direction. In addition, the positive electrode terminal 41 is connected to a lower end of the electrode pin 33 with fixing means such as welding. In addition, the negative electrode terminal is connected to the inner surface of the exterior casing 31 with fixing means such as welding.

The electrode pin 33 is formed from a conductive axis member, and is supported by an insulating body 34 in a state in which a head portion protrudes from an upper end of the insulating body 34. The electrode pin 33 is fixed to an approximately central portion of the battery lid 32 through the insulating body 34. The insulating body 34 is formed from a highly insulating material, and is fitted into a penetration hole 35 provided on a surface side of the battery lid 32. In addition, the electrode pin 33 penetrates through the penetration hole 35, and a leading end of the positive electrode terminal 41 is fixed to the lower end surface of the electrode pin 33.

The battery lid 32, to which the electrode pin 33 and the like are provided, is fitted into the opening of the exterior casing 31, and contact surfaces of the exterior casing 31 and the battery lid 32 are adhered to each other with fixing means such as welding. Therefore, the opening of the exterior casing 31 is sealed by the battery lid 32, and thus is configured in an air-tight and fluid-tight manner. An inner pressure release mechanism 36, which ruptures a part of the battery lid 32 when a pressure inside the exterior casing 31 increases by a predetermined value or more, and allows the inner pressure to be escaped (emitted) to the outside, is provided to the battery lid 32.

The inner pressure release mechanism 36 includes two first opening grooves 36a (one of the first opening grooves 36a is not shown) that linearly extend in a longitudinal direction in the inner surface of the battery lid 32, and a second opening groove 36b that extends in a lateral direction orthogonal to the longitudinal direction in the same inner surface of the battery lid 32 and both ends thereof communicate with the two first opening grooves 36a. The two first opening grooves 36a are provided to be parallel with each other so as to follow long-side side outer edge of the battery lid 32 in the vicinity of inner side of two long-side sides that are positioned to be opposite to each other in the lateral direction of the battery lid 32. In addition, the second opening groove 36b is provided to be positioned at approximately the central portion between one short-side side outer edge and the electrode pin 33 at one side of the longitudinal direction of the electrode pin 33.

For example, the first opening grooves 36a and the second opening groove 36b have a V-shape with a cross-section opened at a lower surface side. In addition, the shape of the first opening groove 36a and the second opening groove 36b is not limited to the V-shape illustrated in this embodiment. For example, the shape of the first opening grooves 36a and the second opening groove 36b may be a U-shape or a semi-circular shape.

An electrolytic solution injection port 37 is provided to penetrate through the battery lid 32. The electrolytic solution injection port 37 is used to inject an electrolytic solution after covering the exterior casing 31 with the battery lid 32, and is sealed with a sealing member 38 after injection of the electrolytic solution.

(3-2) Method of Manufacturing Battery

The laminated electrode body 40 of the third embodiment is manufactured in accordance with the first manufacturing method, the second manufacturing method, or the third manufacturing method that is described in the second embodiment.

In addition, in a case where the thickness of the square battery 30 is large, it is preferable to manufacture the square battery 30 in accordance with the second manufacturing method or the third manufacturing method that is described in the second embodiment. Differently from the laminated film type battery 1 in the second embodiment, in the square battery 30 having a large thickness, it is difficult to form the non-fluidic electrolyte layer by compression and heating from the outside of the battery after the sealing so as to cause the electrolytic solution is supported by the polymeric material. Therefore, it is necessary to manufacture the laminated electrode body 40 after forming the non-fluidic electrolyte layer on the surfaces of the positive electrode and the negative electrode in advance and to assemble the square battery 30.

Assembling of Square Battery

The laminated electrode body 40, which is manufactured by forming the non-fluidic electrolyte layer on the surfaces of the positive electrode and the negative electrode in advance, is accommodated inside the exterior casing 31 that is a square casing formed from, for example, a metal such as aluminum (Al) and iron (Fe).

In addition, after connecting the electrode pin 33 provided to the battery lid 32 and the positive electrode terminal 41 connected to the laminated electrode body 40, the entrance of the exterior casing 31 is sealed with the battery lid 32. Then, the electrolytic solution is injected from the electrolytic solution injection port 37, for example, in a decompressed pressure. Therefore, both of the non-fluidic electrolyte and the fluidic electrolyte are present in the battery. At this time, it is preferable to set an addition amount of the electrolytic solution such that the non-fluidic electrolyte layer that is formed in advance and a fluidic electrolyte layer have the volume ratio described in the first embodiment. Finally, the electrolytic solution injection port 37 is sealed with the sealing member 38. In this manner, the square battery 30, which is shown in FIG. 7, of the present disclosure may be obtained.

Effect

The square battery 30 of the third embodiment has the same effect as the battery 1 of the second embodiment.

4. Fourth Embodiment

In a fourth embodiment, description will be made with respect to another configuration example of the battery using the electrolyte of the first embodiment.

(4-1) Configuration of Battery

Structure of Battery

Figure 8:
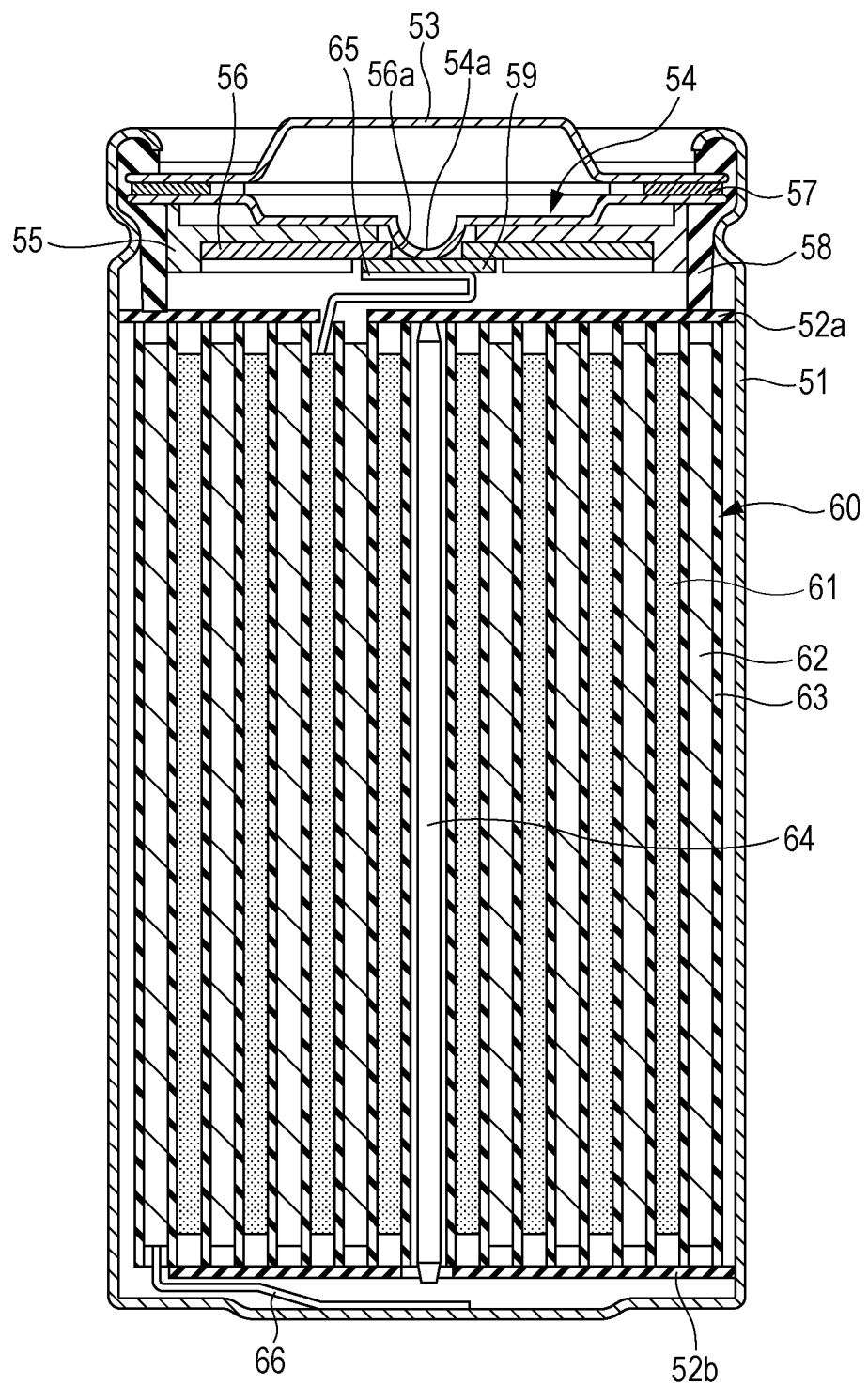
FIG. 8 is a cross-sectional view illustrating a configuration a cylindrical battery according to a fourth embodiment of the present disclosure.

FIG. 8 shows a cross-sectional view illustrating an example of a cylindrical battery 50 according to the fourth embodiment. For example, the cylindrical battery 50 is a nonaqueous electrolyte secondary battery that is capable of being charged and discharged. The cylindrical battery 50 is a so-called cylinder type and includes a wound electrode body 60 formed by winding strip-shaped positive and negative electrodes 61 and 62 with a separator 63 interposed therebetween in a battery casing 51 having an approximately hollow column shape. In the wound electrode body 60, both of the non-fluidic electrolyte and the fluidic electrolyte (not shown) are present between the positive electrode 61 and the separator 63 and between the negative electrode 62 and the separator 63, respectively.

The battery casing 51 is formed from, for example, iron on which nickel-plating is performed, and one end of the battery casing 51 is closed, and the other end is opened. At the inside of the battery casing 51, a pair of insulating plates 52a and 52b is disposed to be orthogonal to a winding circumferential surface such that the wound electrode body 60 is interposed between the insulating plates 52a and 52b.

As a material of the battery casing 51, iron (Fe), Nickel (Ni), stainless steel (SUS), aluminum (Al), titanium (Ti), or the like may be exemplified. For preventing the battery casing 51 from being corroded due to an electrochemical electrolytic solution along with a charging and discharging of the cylindrical battery 50, for example, nickel or the like may be plated on the battery casing 51. At the opened end of the battery casing 51, a battery lid 53 that is a positive electrode lead plate, a safety valve mechanism and a PTC (Positive Temperature Coefficient) element 57 provided at an inner side of the battery lid 53 are mounted in such a manner that they are caulked through an insulating sealing gasket 58.

The battery lid 53 is formed from, for example, the same material as that of the battery casing 51, and has an opening through which a gas generated inside the battery is discharged. In the safety valve mechanism, a safety valve 54, a disc holder 55, and a shielding disc 56 overlap each other in this order. A protruding portion 54a of the safety valve 54 is connected to a positive electrode lead 65 protruded from the wound electrode body 60 through a sub-disc 59 disposed to cover a hole portion 56a formed at the central portion of the shielding disc 56. When the safety valve 54 and the positive electrode lead 65 are connected to each other through the sub-disc 59, it is possible to prevent the positive electrode lead 65 from being drawn from the hole portion 56a at the time of reversion of the safety valve 54. In addition, the safety valve mechanism is electrically connected to the battery lid 53 through the PTC element 57.

In the safety valve mechanism, when an inner pressure of the cylindrical battery 50 reaches a predetermined value or more due to a battery inner short-circuit or heating from the outside of the battery, the safety valve 54 is reversed, and thus the protruding portion 54a, the battery lid 53, and the wound electrode body 60 are electrically disconnected. That is, when the safety valve 54 is reversed, the positive electrode lead 65 is pressed by the shielding disc 56, and thus the connection between the safety valve 54 and the positive electrode lead 65 is released. The disc holder 55 is formed of an insulating material, and when the safety valve 54 is reversed, the safety valve 54 and the shielding disc 56 are insulated.

In addition, in a case where a gas is further generated inside the battery and thus the battery inner pressure is further increased, a part of the safety valve 54 is broken up and the gas is discharged to the battery lid 53 side.

In addition, for example, a plurality of gas discharge holes (not shown) are provided at the periphery of the hole portion 56a of the shielding disc 56, and thus in a case where a gas is generated from the wound electrode body 60, the gas is effectively discharged to the battery lid 53 side.

When the temperature is raised, the resistance value of the PTC element 57 increases, and thus the battery lid 53 and the wound electrode body 60 are electrically disconnected. Therefore, a current is blocked and thus abnormal heat generation due to an excessive current is prevented. The gasket 58 is formed from, for example, an insulating material and asphalt is applied on a surface of the gasket 58.

The wound electrode body 60 accommodated in the cylindrical battery 50 is wound about a center pin 64. The wound electrode body 60 has the same configuration as the second embodiment, and may be obtained by laminating the positive electrode 61 and the negative electrode 62 with the separator 63 interposed therebetween in this order and winding the resultant laminated body in a longitudinal direction. Both of the non-fluidic electrolyte and the fluidic electrolyte are present between the positive electrode 61 and the separator 63 and between the negative electrode 62 and the separator 63 of the wound electrode body 60, respectively. The positive electrode 61, the negative electrode 62, and the separator 63 are the same as those in the first embodiment or the second embodiment, and thus detailed description thereof will not be repeated.

The positive electrode lead 65 is connected to the positive electrode 61, and a negative electrode lead 66 is connected to the negative electrode 62. The positive electrode lead 65 is welded to the safety valve 54 as described above and is electrically connected to the battery lid 53. The negative electrode lead 66 is welded to the battery casing 51 and is electrically connected thereto.

(3-2) Method of Manufacturing Battery

Formation of Non-Fluidic Electrolyte Layer

The wound electrode body 60 is manufactured in accordance with the second manufacturing method or the third manufacturing method that is described in the second embodiment. Differently from the laminated film type battery 1 in the second embodiment, in the cylindrical battery 50, it is difficult to form the non-fluidic electrolyte layer by compression and heating from the outside of the battery after the sealing. Therefore, it is necessary to manufacture the wound electrode body 60 after forming the non-fluidic electrolyte layer on the surfaces of the positive electrode 61 and the negative electrode 62 in advance and to assemble the cylindrical battery 50.

Assembling of Battery

The positive electrode lead 65 is attached to the positive electrode 61 by welding or the like, and the negative electrode lead 66 is attached to the negative electrode 62 by welding or the like. Then, the positive electrode 61 and the negative electrode 62 are wound with the separator 63 interposed therebetween to form the wound electrode body 60.

Subsequently, the front end of the positive electrode lead 65 is welded to the safety valve mechanism, and the leading end of the negative electrode lead 66 is welded to the battery casing 51. Then, the wound electrode body 60 is accommodated in the battery casing 51 with a winding surface of the wound electrode body 60 interposed between the pair of insulating plates 52a and 52b. After accommodating the wound electrode body 60 in the battery casing 51, an electrolytic solution is injected to the inside of the battery basing 51. Therefore, both of the non-fluidic electrolyte and the fluidic electrolyte are present inside the battery. At this time, it is preferable to set the addition amount of the electrolytic solution such that the non-fluidic electrolyte layer that is formed in advance and the fluidic electrolyte have the volume ratio described in the first embodiment.

Subsequently, the battery lid 53, the safety valve mechanism including the safety valve 54 or the like, and the PTC element 57 are fixed to the opened end of the battery casing 51 in such a manner that they are caulked through the gasket 58. In this manner, the cylindrical battery 50, which is shown in FIG. 8, of the present disclosure may be obtained.

Effect

The cylindrical battery 50 of the fourth embodiment has the same effect as the battery 1 of the second embodiment and the square battery 30 of the third embodiment.

5. Fifth Embodiment

In a fifth embodiment, description will be made with respect to a battery pack provided with the battery using the electrolyte, in which both of the non-fluidic electrolyte and the fluidic electrolyte are present, according to the first embodiment.

Figure 9:
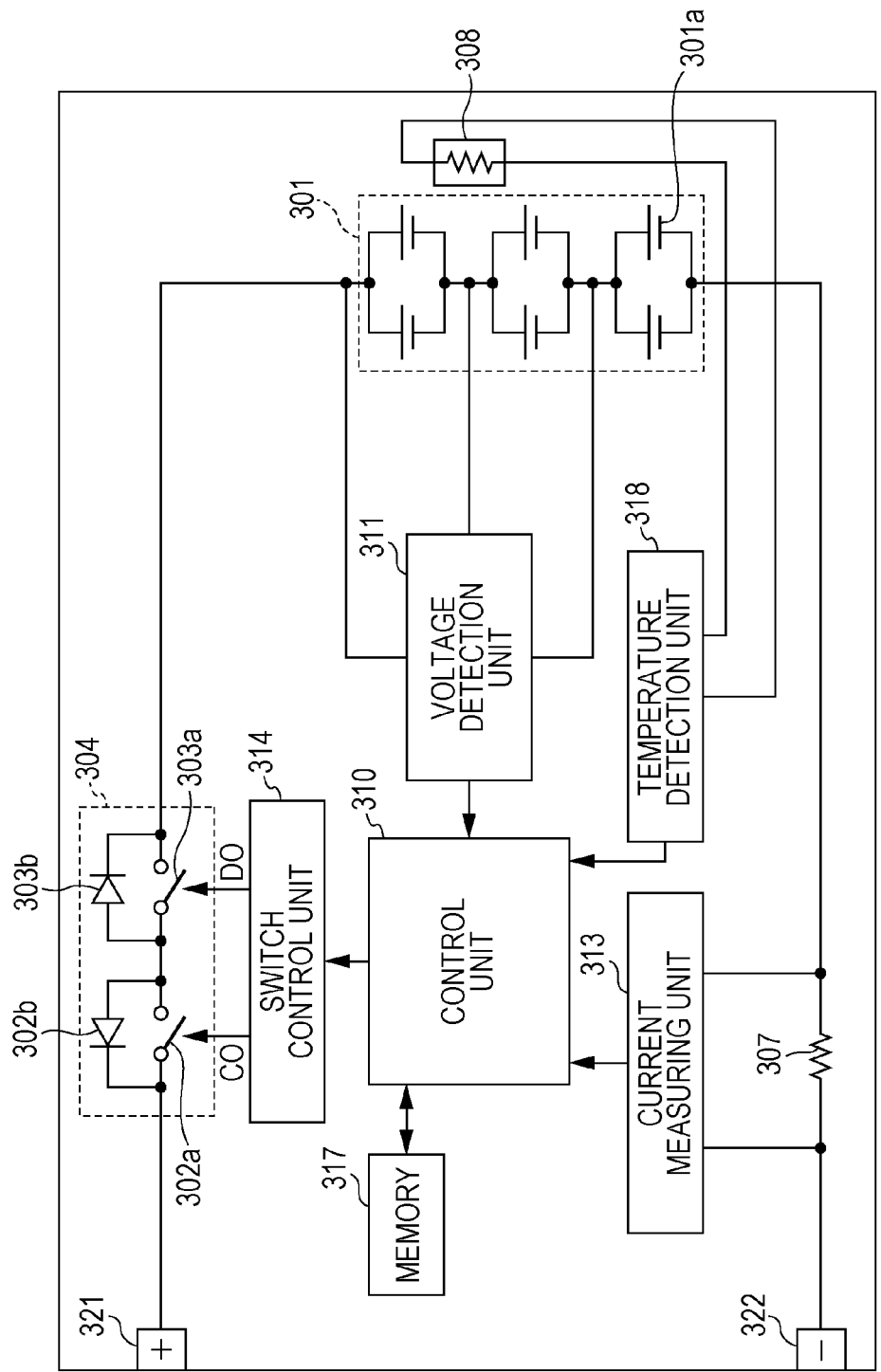
FIG. 9 is a block diagram illustrating a circuit configuration example of a battery pack according to a fifth embodiment of the present disclosure.

FIG. 9 shows a block diagram illustrating a circuit configuration example in a case where the battery (the battery 1, the square battery 30, or the cylindrical battery 50) of the present disclosure is applied to a battery pack. The battery pack includes an assembled battery 301, an exterior package, a switch unit 304 provided with a charge control switch 302a and a discharge control switch 303a, a current detecting resistor 307, a temperature detecting element 308, and a control unit 310.

In addition, the battery pack is provided with a positive electrode terminal 321 and a negative electrode terminal 322, and at the time of charging the battery back, the positive electrode terminal 321 and the negative electrode terminal 322 are connected to a positive electrode terminal and a negative electrode terminal of a charger, respectively, to carry out the charge. In addition, at the time of being used for an electronic apparatus, the positive electrode terminal 321 and the negative electrode terminal 322 are connected to the positive electrode terminal and the negative electrode terminal of the electronic apparatus to carry out the discharge.

The assembled battery 301 is obtained by connecting a plurality of batteries 301a in series and/or in parallel. The batteries 301a are batteries of the present disclosure. In addition, in FIG. 9, a case where six batteries 301a are connected in two-parallel and three-series (2P3S) is illustrated as an example, but in addition to this, an arbitrary connection method such as n-parallel m-series (n and m are integers) is possible.

The switch unit 304 is provided with charge control switch 302a and diode 302b and discharge control switch 303a and diode 303b, and is controlled by the control unit 310. The diode 302b has a reverse directional polarity with respect to a charge current that flows in a direction from the positive electrode terminal 321 to the assembled battery 301, and a forward directional polarity with respect to a discharge current that flows in a direction from the negative electrode terminal 322 to the assembled battery 301. The diode 303b has a forward directional polarity with respect to the charge current and a reverse directional polarity with respect to the discharge current. In addition, in this example, the switch unit 304 is provided at a positive side, but may be provided at a negative side.

The charge control switch 302a is controlled by a charge and discharge control unit in such a manner that when a battery voltage becomes an overcharge detection voltage, the charge control switch 302a is turned off, and thus a charge current does not flow through a current path to the assembled battery 301. After the charge control switch is turned off, only discharge through the diode 302b is possible. In addition, the charge control switch 302a is controlled by the control unit 310 in such a manner that when a large current flows during charging, the charge control switch 302a is turned off so as to block a charge current flowing through the current path of the assembled battery 301.

The discharge control switch 303a is controlled by the control unit 310 in such a manner that when the battery voltage becomes an overdischarge detection voltage, the discharge control switch 303a is turned off, and thus a discharge current does not flow through the current path to the assembled battery 301. After the discharge control switch 303a is turned off, only charging through the diode 303b is possible. In addition, the discharge control switch 303a is controlled by the control unit 310 in such a manner that when a large current flows during discharge, the discharge control switch 303a is turned off so as to block a discharge current flowing through the current path of the assembled battery 301.

For example, the temperature detecting element 308 is a thermistor, and is provided in the vicinity of the assembled battery 301 to measure a temperature of the assembled battery 301 and to supply the measured temperature to the control unit 310. A voltage detecting unit 311 measures the voltage of the assembled battery 301 and the respective batteries 301a making up the assembled battery 301, A/D converts the measured voltage, and supplies the converted voltage to the control unit 310. A current measuring unit 313 measures a current using the current detecting resistor 307, and supplies this measured current to the control unit 310.

A switch control unit 314 controls the charge control switch 302a and the discharge control switch 303a of the switch unit 304 on the basis of the voltage and current that are input from the voltage detecting unit 311 and the current measuring unit 313. When the voltage of several batteries 301a becomes the overcharge detection voltage or the overdischarge detection voltage or less, or when the large current suddenly flows, the switch control unit 314 transmits a control signal to the switch unit 304 so as to prevent overcharging, overdischarging, and overcurrent charging and discharging.

Here, for example, in a case where the battery is a lithium ion secondary battery, and a material, which becomes a lithium alloy in the vicinity of 0 V with respect to $Li/Li^+$, is used as the negative electrode active material, the overcharge detection voltage is defined to, for example, 4.20 V±0.05V, and the overdischarge detection voltage is defined to, for example, 2.4 V±0.1 V.

As charge and discharge switches, for example, a semiconductor switch such as an MOSFET may be used. In this case, parasitic diodes of the MOSFET function as the diodes 302b and 303b. In a case where P-channel type FETs are used as the charge and discharge switches, the switch control unit 314 supplies control signals DO and CO with respect to respective gates of the charge control switch 302a and the discharge control switch 303a, respectively. In a case where charge control switch 302a and the discharge control switch 303a are P-channel type switches, the switches are turned on with respect to a gate potential lower than a source potential by a predetermined value or more. That is, in normal charging and discharging operations, the control signal CO and DO are set to be a low level, and the charge control switch 302a and the discharge control switch 303a are turned on.

In addition, for example, during overcharge or overdischarge, the control signals CO and DO are set to be a high level, and the charge control switch 302a and the discharge control switch 303a are turned off.

A memory 317 is composed of a RAM or ROM, for example, an EPROM (Erasable Programmable Read Only Memory) that is a nonvolatile memory or the like. In the memory 317, a value calculated by the control unit 310, an internal resistance value, which is measured at a manufacturing process stage, of the battery at an initial state of the respective batteries 301a, and the like are stored in advance, and these value may be appropriately rewritten. In addition, when a full charge capacity of the batteries 301a is stored in the memory 317, for example, a remaining capacity may be calculated in combination with the control unit 310.

In a temperature detecting unit 318, the temperature is measured using the temperature detecting element 308, and at the time of abnormal heat generation, a charge and discharge control is performed, or correction is performed during calculation of the remaining capacity.

6. Sixth Embodiment

In a sixth embodiment, description will be made with respect to apparatuses such as an electronic apparatus, an electrically driven vehicle, and an electrical storage device on which each of the batteries according to the second to fourth embodiments or the battery pack according to the fifth embodiment is mounted. The batteries and the battery pack described in the second to fifth embodiment may be used to supply electric power to the apparatuses such as the electronic apparatus, the electrically driven vehicle, and the electrical storage device.

Examples of the electronic apparatus include a notebook computer, a PDA (portable information terminal), a cellular phone, a cordless phone handset, a video movie, a digital still camera, an electronic book, an electronic dictionary, a music player, a radio, a headphone, a gaming machine, a navigation system, a memory card, a pacemaker, a hearing aid, an electric tool, an electric shaver, a refrigerator, an air-conditioner, a television, a stereo, a water heater, a microwave oven, a dishwasher, a washing machine, a dryer, an illumination apparatus, a toy, a medical apparatus, a robot, a road conditioner, a signal apparatus, and the like.

In addition, examples of the electrically driven vehicle include a railway vehicle, a golf cart, an electrically driven cart, an electric vehicle (including a hybrid car), and the like, and the batteries are used as a driving power supply or an auxiliary power supply of the vehicles.

Examples of the electrical storage device include power supplies for electrical storage of buildings starting from a house or a power generating facility.

Hereinafter, among the above-described application examples, specific examples of the electrical storage system using an electrical storage device to which the batteries of the present disclosure are applied will be described.

As the electrical storage system, the following configuration may be exemplified. A first electrical storage system is an electrical storage system in which an electrical storage device is charged by a power generator that performs power generation from renewable energy. A second electrical storage system is an electrical storage system that is provided with an electrical storage device and supplies electric power to an electronic apparatus that is connected to the electrical storage device. A third electrical storage system is an electronic apparatus to which electric power is supplied from an electrical storage device. This electrical storage system is executed as a system that realizes effective power supply in cooperation with an external power supply network.

In addition, a fourth electrical storage system is an electrically driven vehicle provided with a conversion device to which electric power is supplied from an electrical storage device and which converts the electric power to a driving force of a vehicle, and a control device that performs information processing relating to a vehicle control on the basis of information relating to the electrical storage device. A fifth electrical storage system is a power system that is provided with an electric power information transmitting and receiving unit that transmits and receives electric power information to and from other apparatuses through a network, a charge and discharge control of the above-described electrical storage device is performed on the basis of the information that is received by the transmitting and receiving unit. A sixth electrical storage system is a power system to which electric power is supplied from the above-described electrical storage device or which supplies electric power from a power generator or a power network to the electrical storage device. Hereinafter, the electrical storage system will be described.

(6-1) Electrical Storage System in House as Application Example

Figure 10:
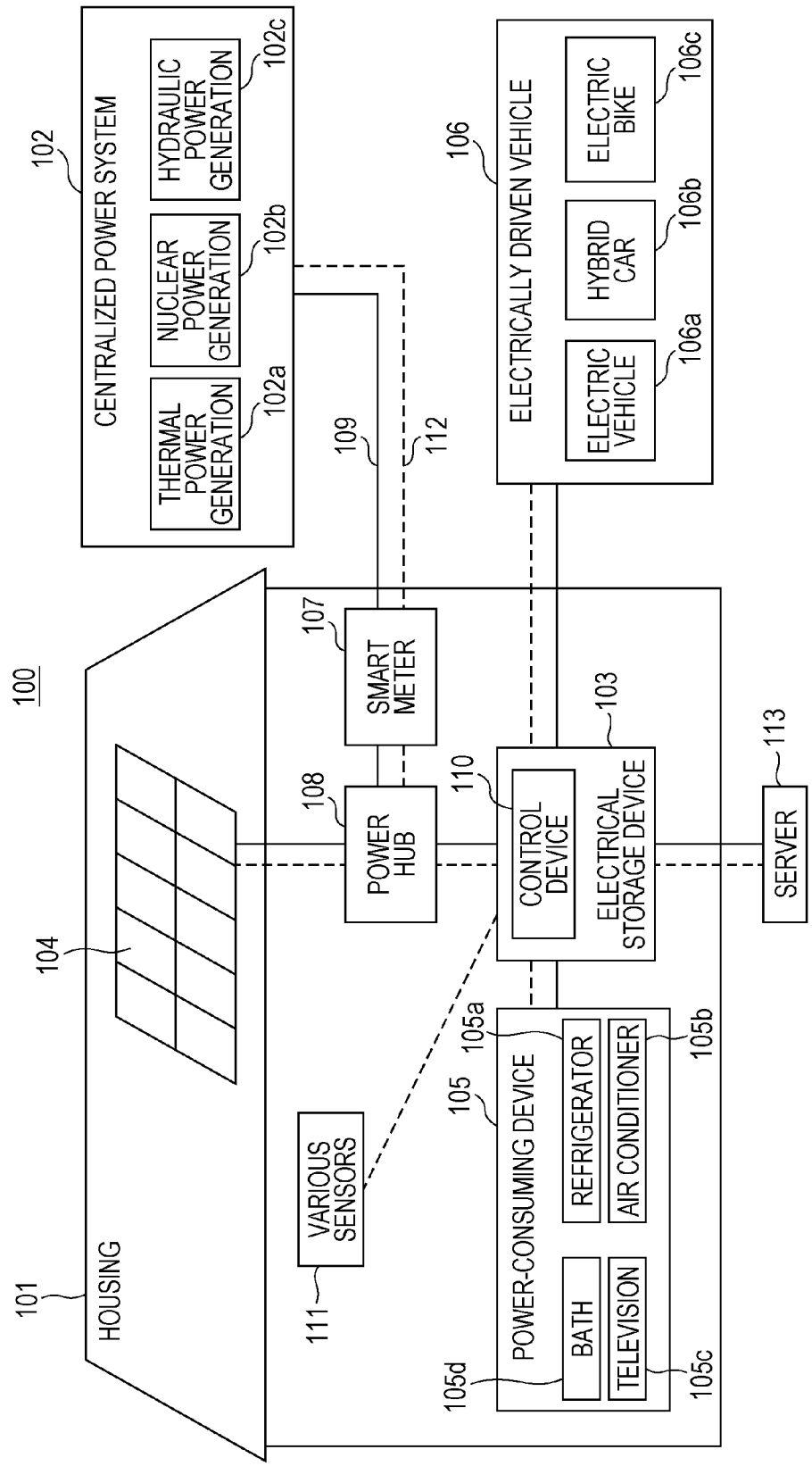
FIG. 10 is a schematic diagram illustrating an example in which application is made to an electrical storage system for a house according to a sixth embodiment of the present disclosure.

An example in which an electrical storage device using the battery of the present disclosure is applied to an electrical storage system for a house will be described with reference to FIG. 10. For example, in an electrical storage system 100 for a house 101, electric power is supplied to an electrical storage device 103 from a centralized power system 102 such as a thermal power generation 102a, a nuclear power generation 102b, a hydraulic generation 102c through a power network 109, an information network 112, a smart meter 107, a power hub 108, and the like. In addition, electric power from an independent power supply such as an in-house power generator 104 is supplied to the electrical storage device 103. The electric power supplied to the electrical storage device 103 is stored. Electric power that is used in the house 101 is supplied by using the electrical storage device 103. The same electrical storage system may also be used with respect to a building without being limited to the house 101.

The in-house power generator 104, power-consuming devices 105, the electrical storage device 103, a control device 110 that controls various devices, the smart meter 107, and sensors 111 that acquire various pieces of information are provided to the house 101. The respective devices are connected by the power network 109 and the information network 112. As the in-house power generator 104, a solar cell, a fuel cell, or the like is used, and generated power is supplied to the power-consuming devices 105 and/or the electrical storage device 103. Examples of the power-consuming devices 105 include a refrigerator 105a, an air-conditioner 105b, a television receiver 105c, a bath 105d, and the like. In addition, examples of the power-consuming device 105 include an electrically driven vehicle 106. Examples of the electrically driven vehicle 106 include an electric vehicle 106a, a hybrid car 106b, and an electric bike 106c.

The battery of the present disclosure is applied with respect to this electrical storage device 103. The battery of the present disclosure may be configured by the above-described lithium ion secondary battery. The smart meter 107 has a function of measuring the amount of commercial power used and of transmitting this measured used amount to a power company. The power network 109 may be any one of a DC power supply type, an AC power supply type, and non-contact power supply type, or a combination thereof.

Examples of the various sensors 111 include a motion sensing sensor, a luminance sensor, an object sensing sensor, a power-consumption sensor, a vibration sensor, a contact sensor, a temperature sensor, an infrared sensor, and the like. Information acquired by the various sensors 111 is transmitted to the control device 110. Weather conditions, conditions of human, or the like is grasped by the information transmitted from the sensors 111, and the power-consuming devices 105 are automatically controlled. Therefore, it is possible to make the power-consumption minimal. In addition, the control device 110 may transmit information related to the house 101 to an external power company or the like through the Internet.

Processes such as divergence of power lines and DC-AC conversion are performed by the power hub 108. As a communication method of the information network 112 connected to the control device 110, a method using a communication interface such as a UART (Universal Asynchronous Receiver-Transmitter: transmission and reception circuit for asynchronous serial communication), and a method using a sensor network compliant to a wireless communication standard such as Bluetooth (a registered trademark of Bluetooth SIG), ZigBee, and Wi-Fi may be exemplified. The Bluetooth method is applied to multimedia communication and may perform one-to-multi-connection communication. The ZigBee uses a physical layer of IEEE (Institute of Electrical and Electronics Engineers) 802.15.4. IEEE 802.15.4 is the name of a short-range wireless network standard called a PAN (Personal Area Network) or W (Wireless) PAN.

The control device 110 is connected to an external server 113. The server 113 may be controlled by any one of the house 101, the power company, and a service provider. As information that is transmitted to and received from the server 113, for example, power-consumption information, life pattern information, power rates, weather information, disaster information, and information related to power transaction may be exemplified. These kinds of information may be transmitted to and received from in-house power-consuming devices (for example, television receivers), but may be transmitted to and received from devices (for example, cellular phones, or the like) positioned at the outside of the house. These kinds of information may be displayed on, for example, a television receiver, a cellular phone, a PDA (Personal Digital Assistant), or the like, which has a display function.

The control device 110 that controls each unit includes a CPU (Central Processing Unit), a RAM (Random Access Memory), a ROM (Read Only Memory), or the like, and is accommodated in the electrical storage device 103 in this example. The control device 110 is connected to the electrical storage device 103, the in-house power generator 104, the power-consuming devices 105, the various sensors 111, and the server 113 through the information network 112, and has, for example, a function of adjusting the used amount of commercial power and an amount of power generation. Furthermore, in addition to this function, the control device 110 may have a function of performing power transaction in a power market, or the like.

As described above, a generated output of the in-house power generator 104 (photovoltaic generation and wind power generation) as well as the centralized power system 102 such as the thermal power generation 102a, the nuclear power generation 102b, and the hydraulic power generation 102c may be stored in the electrical storage device 103. Therefore, even when the generated output of the in-house power generator 104 varies, it is possible to make an amount of power that is transmitted to the outside uniform, or it is possible to control discharge as much as necessary. For example, a method of use described below may be considered. Specifically, the electric power that is obtained from the photovoltaic generation is stored in the electrical storage device 103, and inexpensive midnight power is also stored in the electrical storage device 103 at night, and then the electric power that is stored in the electrical storage device 103 is discharged to be used in a period of time at which a rate is expensive in the day time.

In addition, in this example, an example in which the control device 110 is accommodated in the electrical storage device 103 was described, but the control device 110 may be accommodated in the smart meter 107, or may be configured independently. Furthermore, the electrical storage system 100 may be used in a plurality of homes as targets in regard to an apartment house, or may be used in a plurality of detached houses as targets.

(6-2) Electrical Storage System in Vehicle as Application Example

Figure 11:
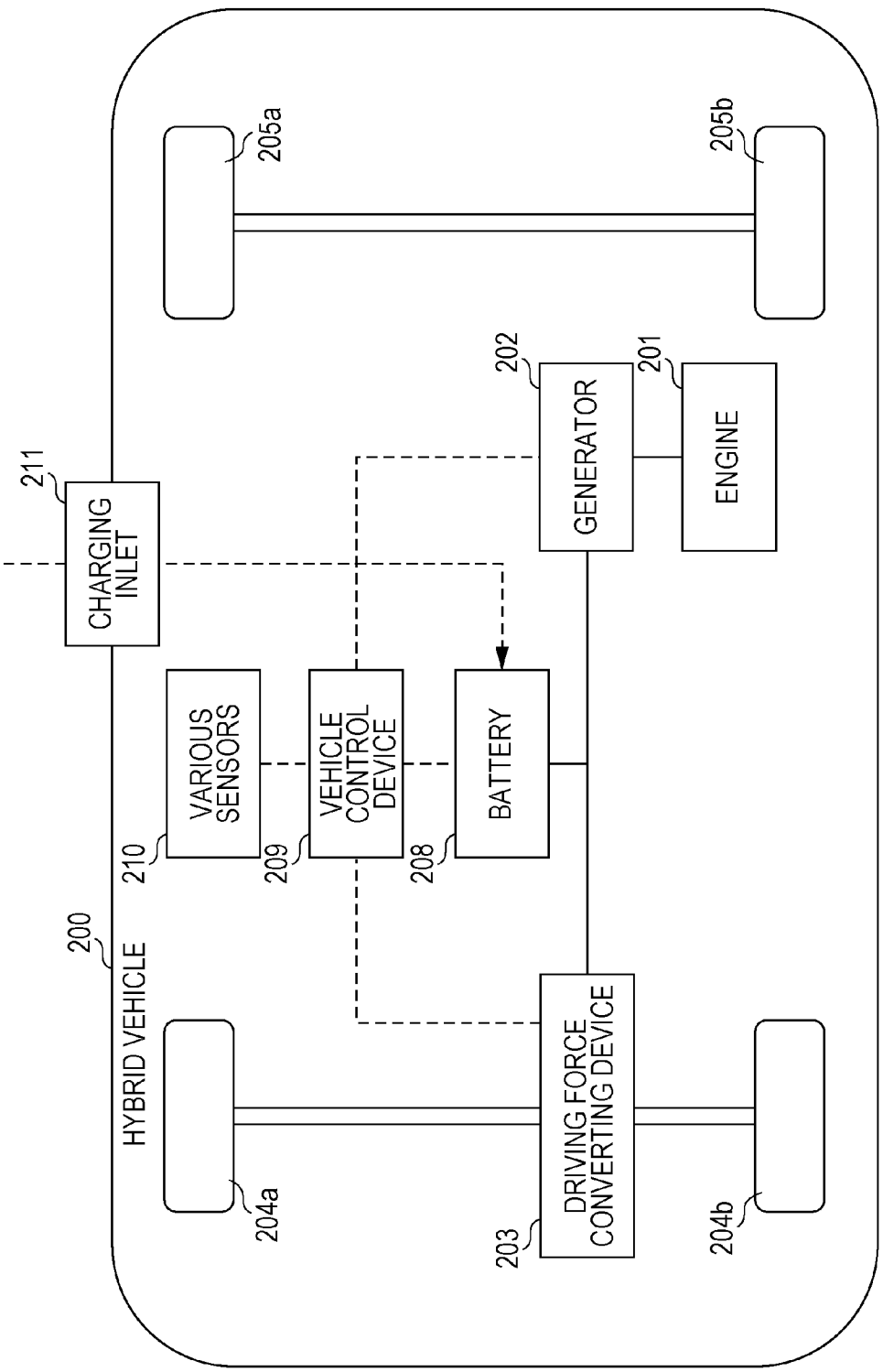
FIG. 11 is a schematic diagram illustrating an example of a configuration of a hybrid car adopting a series hybrid system to which the present disclosure is applied.

An example in which the present disclosure is applied to an electrical storage system for a vehicle will be described with reference to FIG. 11. FIG. 11 schematically illustrates a configuration example of a hybrid car that adopts a series hybrid system to which the present disclosure is applied. The series hybrid system is a vehicle that travels with a power-driving force converting device by using electric power generated by a generator moved by an engine or the electric power that is temporarily stored in a battery.

In the hybrid vehicle 200, an engine 201, a generator 202, a power-driving force converting device 203, a driving wheel 204a, a driving wheel 204b, a wheel 205a, a wheel 205b, a battery 208, a vehicle control device 209, various sensors 210, and a charging inlet 211 are mounted. As the battery 208, the above-described battery of the present disclosure is applied.

The hybrid vehicle 200 travels using the power-driving force converting device 203 as a power source. An example of the power-driving force converting device 203 is a motor. The power-driving force converting device 203 operates by electric power of the battery 208, and the torque of the power-driving force converting device 203 is transferred to the driving wheels 204a and 204b. In addition, the power-driving force converting device 203 may be applicable to an AC motor or a DC motor by using a DC-AC conversion or an invert conversion (AC-DC conversion) as necessary. The various sensors 210 control the engine speed or the opening degree of a throttle valve (not shown) (throttle opening degree) through the vehicle control device 209. Examples of the various sensors 210 include a speed sensor, an acceleration sensor, an engine speed sensor, and the like.

A torque of the engine 201 may be transferred to the generator 202, and electric power generated by the generator 202 using the torque may be stored in the battery 208.

When the hybrid vehicle 200 is decelerated by a brake mechanism (not shown), a resistance force during the deceleration is added to the power-driving force converting device 203 as a torque, and regenerated electric power that is generated by the power-driving force converting device 203 due to the torque is stored in the battery 208.

When the battery 208 is connected to an external power supply outside the hybrid vehicle 200, electric power may be supplied to the battery 208 from the external power supply by using the charging inlet 211 as an input inlet and may store the supplied electric power.

Although not shown, an information processing device that performs an information processing related to vehicle control on the basis of information related to the battery may be provided. As this information processing device, for example, an information processing device that performs a display of a residual amount of the battery on the basis of information about the residual amount of the battery, or the like may be exemplified.

In addition, hereinbefore, description was made with respect to the series hybrid car that travels with a motor by using electric power generated by a generator moved by an engine or the electric power that is temporarily stored in a battery as an example. However, the present disclosure may be effectively applied to a parallel hybrid car that uses both the output of the engine and the output of the motor as driving sources, and utilizes three types of traveling using the engine only, traveling using the motor only, and traveling using the engine and motor by appropriately changing these types. In addition, the present disclosure may be effectively applied with respect to a so-called electrically driven vehicle that travels using driving by a driving motor only without using the engine.

EXAMPLES

Hereinafter, the present disclosure will be described in detail with reference examples. In addition, a configuration of the present disclosure is not limited to the examples to be described below.

In addition, imide salt compounds that are used in examples and comparative examples are as follows.

Chem. A: Lithium bis(fluorosulfonyl) imide

Chem. B: Lithium (fluorosulfonyl)(trifluorosulfonyl) imide

Chem. C: Lithium bis(trifluoromethyl sulfonyl) imide

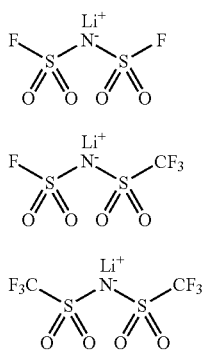

Examples 1-1 to 1-24, and Comparative Examples 1-1 and 1-2

In examples 1-1 to 1-24, and comparative examples 1-1 and 1-2, a volume ratio of the non-fluidic electrolyte with respect to the entirety of the electrolyte was changed by changing the film thickness of the non-fluidic electrolyte layer, and the treatment temperature during formation of the non-fluidic electrolyte layer was changed, and then battery characteristics were evaluated.

Example 1-1

Manufacturing of Positive Electrode 92 parts by mass of lithium iron phosphate (LiFePO$_4$) present as a positive electrode active material, 3 parts by mass of ketjen black present as a conductive material, and 5 parts by mass of polyvinylidene fluoride (PVdF) present as a binding material were mixed to prepare a positive electrode mixture. Then, this positive electrode mixture was dispersed in N-methyl-2-pyrrolidone (NMP) to prepare positive electrode mixture slurry. This positive electrode mixture slurry was applied to both surfaces of a positive electrode current collector formed from strip-shaped aluminum foil having a thickness of 10 μm in such a manner that part of the positive electrode current collector was exposed. Then, a dispersion medium of the applied positive electrode mixture slurry was evaporated and dried, and then compression molding was performed using a roll press. In this manner, a positive electrode active material layer having a thickness of 30 μm and a volume density of 2.0 g/cc was formed. Finally, the resultant positive electrode current collector on which the positive electrode active material layer was formed was cut into a shape having a width of 50 cm and a length of 300 mm, and a positive electrode terminal was attached to the exposed portion of the positive electrode current collector, whereby a positive electrode was formed.

Manufacturing of Negative Electrode 97 parts by mass of meso-carbon micro bead present as a negative electrode active material, 3 parts by mass of polyvinylidene fluoride (PVdF) present as a binding material were mixed to prepare a negative electrode mixture. Then, this negative electrode mixture was dispersed in N-methyl-2-pyrrolidone (NMP) to prepare negative electrode mixture slurry. This negative electrode mixture slurry was applied to both surfaces of a negative electrode current collector formed from strip-shaped copper foil having a thickness of 10 μm in such a manner that part of the negative electrode current collector was exposed. Then, a dispersion medium of the applied negative electrode mixture slurry was evaporated and dried, and then compression molding was performed using a roll press. In this manner, a negative electrode active material layer having a thickness of 30 μm and a volume density of 1.65 g/cc was formed. Finally, the resultant negative electrode current collector on which the negative electrode active material layer was formed was cut into a shape having a width of 50 cm and a length of 300 mm, and a negative electrode terminal was attached to the exposed portion of the negative electrode current collector, whereby a negative electrode was formed.

Separator

A member, which had a thickness of 16 μm and was obtained by applying a polymeric material supporting an electrolytic solution on both surfaces of a finely porous polyethylene film, was used as a separator. As the polymeric material, polyvinylidene fluoride (PVdF) having a weight-average molecular weight of 1,000,000 measured in accordance with a gel penetration chromatography method was used, and PVdF was applied to both surfaces of the finely porous polyethylene film in a thickness of 1 μm for each surface (total thickness of both surfaces was 2 μm), whereby a separator was obtained.

Electrolytic Solution

As an electrolytic solution, a material obtained by adding the imide salt compound of Chem. A in a concentration of 1.0 mol/kg with respect to a nonaqueous solvent of ethylene carbonate (EC):ethyl methyl carbonate (EMC)=3:7 (mass ratio) was used.

In addition, the non-fluidic electrolyte layer was formed by making the electrolytic solution be supported by the polyvinylidene fluoride that was applied on the surface of the separator.

Assembling of Battery

The positive electrode and the negative electrode were wound with the separator interposed therebetween, whereby a wound electrode body was manufactured. Subsequently, the wound electrode body was inserted into an exterior packaging member that was obtained by forming an aluminum laminated film into a bag shape, 2 g of an electrolytic solution was injected into the exterior packaging member, and then the exterior packaging member was sealed by thermal fusion in a decompressed atmosphere. Finally, the entirety of the battery was heated to 100° C. and pressed to make part of the electrolytic solution be supported by the polymeric compound on the surface of the separator and to make the electrolytic solution gelate. In this manner, the non-fluidic electrolyte layer was formed on the surface of the separator, whereby a laminated film type battery was manufactured.

In addition, in the battery of Example 1-1, the volume ratio of the non-fluidic electrolyte in the entirety of the electrolyte (the total volume of the non-fluidic electrolyte layer and the fluidic electrolyte layer) was 2.2 vol %. The volume ratio of the non-fluidic electrolyte in the entirety of the electrolyte was calculated from a SEM image obtained by using energy dispersive X-ray spectroscopy (SEM-EDX). That is, the cross-sectional area of the non-fluidic electrolyte layer and the cross-sectional area of the fluidic electrolyte layer remained without gelation were obtained from a secondary electron image that was obtained by scanning a cross-section of the electrode body after disassembling the battery and taking out the wound electrode body, and the volume ratio was calculated by assuming that the ratio of the cross-section is approximately the same as the volume ratio.

Example 1-2

A laminated film type battery was manufactured in the same manner as Example 1-1 except that during assembling of the battery, a heating temperature when forming the non-fluidic electrolyte layer was set to 110° C. In the battery of Example 1-2, the volume ratio of the non-fluidic electrolyte in the entirety of the electrolyte was 2.2 vol %.

Example 1-3

A laminated film type battery was manufactured in the same manner as Example 1-1 except that during assembling of the battery, the heating temperature when forming the non-fluidic electrolyte layer was set to 120° C. In the battery of Example 1-3, the volume ratio of the non-fluidic electrolyte in the entirety of the electrolyte was 2.2 vol %.

Examples 1-4 to 1-6

Laminated film type batteries were manufactured in the same manner as Examples 1-1 to 1-3, respectively, except that the thickness of the polyvinylidene fluoride applied to the surface of the separator was set to 2 µm for each surface (total thickness of both surfaces was 4 µm). In the batteries of Examples 1-4 to 1-6, the volume ratio of the non-fluidic electrolyte in the entirety of the electrolyte was 4.1 vol %.

Examples 1-7 to 1-9

Laminated film type batteries were manufactured in the same manner as Examples 1-1 to 1-3, respectively, except that the thickness of the polyvinylidene fluoride applied to the surface of the separator was set to 3 µm for each surface (total thickness of both surfaces was 6 µm). In the batteries of Examples 1-7 to 1-9, the volume ratio of the non-fluidic electrolyte in the entirety of the electrolyte was 5.6 vol %.

Examples 1-10 to 1-12

Laminated film type batteries were manufactured in the same manner as Examples 1-1 to 1-3, respectively, except that the thickness of the polyvinylidene fluoride applied to the surface of the separator was set to 8 µm for each surface (total thickness of both surfaces was 16 µm). In the batteries of Examples 1-10 to 1-12, the volume ratio of the non-fluidic electrolyte in the entirety of the electrolyte was 10 vol %.

Comparative Example 1-1

A laminated film type battery was manufactured in the same manner as Example 1-1 except that polyvinylidene fluoride was not applied to the surface of the separator.

Examples 1-13 to 1-24

Laminated film type batteries were manufactured in the same manner as Examples 1-1 to 1-12 except that instead of the imide salt compound of Chem. A, hexafluorophosphate ($LiPF_6$) was used as the electrolyte salt. In the batteries of Examples 1-13 to 1-15, the volume ratio of the non-fluidic electrolyte in the entirety of the electrolyte was 2.2 vol %. In the batteries of Examples 1-16 to 1-18, the volume ratio of the non-fluidic electrolyte in the entirety of the electrolyte was 4.1 vol %. In the batteries of Examples 1-19 to 1-21, the volume ratio of the non-fluidic electrolyte in the entirety of the electrolyte was 5.6 vol %. In the batteries of Examples 1-22 to 1-24, the volume ratio of the non-fluidic electrolyte in the entirety of the electrolyte was 10 vol %.

Comparative Example 1-2

A laminated film type battery was manufactured in the same manner as Comparative Examples 1-1 except that instead of the imide salt compound of Chem. A, hexafluorophosphate ($LiPF_6$) was used as the electrolyte salt.

Evaluation of Battery (a) High-Temperature Cycle Test

After the batteries of the respective examples and comparative examples were subjected to a constant current charge with a charge current of 0.2 C in an environment of 23° C. until the battery voltage reached 4.0 V, the batteries were subjected to a constant voltage charge with a battery voltage of 4.0 V, and the charge was terminated at a point in time at which the charge current reached 0.05 C. Subsequently, the batteries were subjected to a constant current discharge with a discharge current of 0.2 C until the battery voltage reached 2.0 V. Two charging and discharging cycles were performed under the same conditions, and the discharge capacity at the $2^{nd}$ cycle was measured.

Subsequently, charging and discharging up to 300 cycles was repeated under the same conditions as the above-described charge and discharge conditions except that the environment temperature was set to 65° C., and then the discharge capacity at the $300^{th}$ cycle was measured. The capacity retention rate after 300 cycles in a high-temperature environment was calculated by the following expression.

High-temperature capacity retention rate[%]=(discharge capacity at $300^{th}$ cycle/discharge capacity at $2^{nd}$ cycle)×100

(b) High-Temperature Storage Test

The batteries of the respective examples and comparative examples were subjected to a constant current charge with a charge current of 0.2 C in an environment of 23° C. until the battery voltage reached 4.0 V, the batteries were subjected to a constant voltage charge with a battery voltage of 4.0 V, and the charge was terminated at a point in time at which the charge current reached 0.05 C. Subsequently, the batteries were subjected to a constant current discharge with a discharge current of 0.2 C until the battery voltage reached 2.0 V. Two charging and discharging cycles were performed under the same conditions, and then the battery thickness was measured.

Subsequently, the batteries of the respective examples and comparative examples were charged with a battery voltage of 4.0 V for three hours in an environment of 23° C., and then the batteries were stored for 24 hours in a constant temperature bath of 80° C. while maintaining the charged state, and then the battery thickness after the storage was measured. A battery thickness increase rate after the high-temperature storage was calculated by the following expression.

Battery thickness increase rate after high-temperature storage[%]={(battery thickness after high-temperature storage−battery thickness before high-temperature storage)}×100

(c) Discharge Temperature Characteristic Test

After the batteries of the respective examples and comparative examples were subjected to a constant current charge with a charge current of 0.2 C in an environment of 23° C. until the battery voltage reached 4.0 V, the batteries were subjected to a constant voltage charge with a battery voltage of 4.0 V, and the charge was terminated at a point in time at which the charge current reached 0.05 C. Subsequently, the batteries were subjected to a constant current discharge with a discharge current of 0.2 C until the battery voltage reached 2.0 V. Two charging and discharging cycles were performed under the same conditions.

Subsequently, after the batteries of the respective examples and comparative examples were charged for three hours with a battery voltage of 4.0 V in an environment of 23° C., and the batteries were subjected to a constant current discharge with a discharge current of 0.2 C until the battery voltage reached 2.0 V, the discharge capacity (23° C. discharge capacity) at this time was measured. Next, after the batteries were charged with a battery voltage of 4.0 V for three hours in an environment of 23° C., and the batteries were subjected to a constant current discharge with a discharge current 0.2 C in an environment of 0° C. until the battery voltage reached 2.0 V, the discharge capacity (0° C. discharge capacity) at this time was measured. The discharge-temperature capacity retention rate was calculated by the following expression.

Discharge-temperature capacity retention rate [%]= (0° C. discharge capacity/23° C. discharge capacity)×100

Evaluation results are shown in Table 1 described below.

TABLE 1

| | Positive electrode active material Kind | Electrolyte salt | | Non-fluidic electrolyte layer | | | |
|---|---|---|---|---|---|---|---|
| | | | | | Gelation | | Volume |
| | | Kind | Concentration [mol/kg] | Polymer | Molecular weight | temperature [° C.] | Thickness [μm] | ratio [vol %] |
| Example 1-1 | LiFePO$_4$ | Chem. A | 1.0 | PVdF | 1,000,000 | 100 | 2 | 2.2 |
| Example 1-2 | LiFePO$_4$ | Chem. A | 1.0 | PVdF | 1,000,000 | 110 | 2 | 2.2 |
| Example 1-3 | LiFePO$_4$ | Chem. A | 1.0 | PVdF | 1,000,000 | 120 | 2 | 2.2 |
| Example 1-4 | LiFePO$_4$ | Chem. A | 1.0 | PVdF | 1,000,000 | 100 | 4 | 4.1 |
| Example 1-5 | LiFePO$_4$ | Chem. A | 1.0 | PVdF | 1,000,000 | 110 | 4 | 4.1 |
| Example 1-6 | LiFePO$_4$ | Chem. A | 1.0 | PVdF | 1,000,000 | 120 | 4 | 4.1 |
| Example 1-7 | LiFePO$_4$ | Chem. A | 1.0 | PVdF | 1,000,000 | 100 | 6 | 5.6 |
| Example 1-8 | LiFePO$_4$ | Chem. A | 1.0 | PVdF | 1,000,000 | 110 | 6 | 5.6 |
| Example 1-9 | LiFePO$_4$ | Chem. A | 1.0 | PVdF | 1,000,000 | 120 | 6 | 5.6 |
| Example 1-10 | LiFePO$_4$ | Chem. A | 1.0 | PVdF | 1,000,000 | 100 | 16 | 10 |
| Example 1-11 | LiFePO$_4$ | Chem. A | 1.0 | PVdF | 1,000,000 | 110 | 16 | 10 |
| Example 1-12 | LiFePO$_4$ | Chem. A | 1.0 | PVdF | 1,000,000 | 120 | 16 | 10 |
| Comparative Example 1-1 | LiFePO$_4$ | Chem. A | 1.0 | — | — | — | — | 0 |
| Example 1-13 | LiFePO$_4$ | LiPF$_6$ | 1.0 | PVdF | 1,000,000 | 100 | 2 | 2.2 |
| Example 1-14 | LiFePO$_4$ | LiPF$_6$ | 1.0 | PVdF | 1,000,000 | 110 | 2 | 2.2 |
| Example 1-15 | LiFePO$_4$ | LiPF$_6$ | 1.0 | PVdF | 1,000,000 | 120 | 2 | 2.2 |
| Example 1-16 | LiFePO$_4$ | LiPF$_6$ | 1.0 | PVdF | 1,000,000 | 100 | 4 | 4.1 |
| Example 1-17 | LiFePO$_4$ | LiPF$_6$ | 1.0 | PVdF | 1,000,000 | 110 | 4 | 4.1 |
| Example 1-18 | LiFePO$_4$ | LiPF$_6$ | 1.0 | PVdF | 1,000,000 | 120 | 4 | 4.1 |
| Example 1-19 | LiFePO$_4$ | LiPF$_6$ | 1.0 | PVdF | 1,000,000 | 100 | 6 | 5.6 |
| Example 1-20 | LiFePO$_4$ | LiPF$_6$ | 1.0 | PVdF | 1,000,000 | 110 | 6 | 5.6 |
| Example 1-21 | LiFePO$_4$ | LiPF$_6$ | 1.0 | PVdF | 1,000,000 | 120 | 6 | 5.6 |
| Example 1-22 | LiFePO$_4$ | LiPF$_6$ | 1.0 | PVdF | 1,000,000 | 100 | 16 | 10 |
| Example 1-23 | LiFePO$_4$ | LiPF$_6$ | 1.0 | PVdF | 1,000,000 | 110 | 16 | 10 |
| Example 1-24 | LiFePO$_4$ | LiPF$_6$ | 1.0 | PVdF | 1,000,000 | 120 | 16 | 10 |
| Comparative Example 1-2 | LiFePO$_4$ | LiPF$_6$ | 1.0 | — | — | — | — | 0 |

| | High-temperature capacity retention rate [%] | Battery thickness increase rate after high-temperature storage [%] | Discharge temperature capacity retention rate [%] |
|---|---|---|---|
| Example 1-1 | 90 | 5.6 | 95 |
| Example 1-2 | 92 | 5.2 | 95 |
| Example 1-3 | 92 | 5.3 | 96 |
| Example 1-4 | 91 | 5.0 | 95 |
| Example 1-5 | 92 | 5.0 | 95 |
| Example 1-6 | 92 | 4.8 | 94 |
| Example 1-7 | 91 | 4.8 | 91 |
| Example 1-8 | 90 | 4.8 | 93 |
| Example 1-9 | 88 | 4.7 | 92 |
| Example 1-10 | 82 | 4.5 | 70 |
| Example 1-11 | 82 | 4.5 | 72 |
| Example 1-12 | 81 | 4.5 | 68 |
| Comparative Example 1-1 | 71 | 8.3 | 85 |
| Example 1-13 | 48 | 16.5 | 92 |
| Example 1-14 | 46 | 16.3 | 90 |
| Example 1-15 | 40 | 19.4 | 90 |
| Example 1-16 | 55 | 15.7 | 88 |
| Example 1-17 | 55 | 14.2 | 89 |
| Example 1-18 | 42 | 18.5 | 88 |
| Example 1-19 | 56 | 14.9 | 85 |
| Example 1-20 | 56 | 13.8 | 86 |

TABLE 1-continued

| | | | |
|---|---|---|---|
| Example 1-21 | 42 | 18.6 | 82 |
| Example 1-22 | 58 | 14.1 | 64 |
| Example 1-23 | 56 | 14.0 | 62 |
| Example 1-24 | 41 | 18.4 | 59 |
| Comparative Example 1-2 | 42 | 22.5 | 83 |

As can be seen from Table 1, among Examples 1-1 to 1-12 and Comparative Example 1-1 in which the imide salt compound of Chem. A was used as the electrolyte salt, in Examples 1-1 to 1-12 in which both of the non-fluidic electrolyte and the fluidic electrolyte were present, battery characteristics were improved. In Examples 1-10 to 1-12 in which the volume ratio exceeds 6 vol %, the high-temperature capacity retention rate was improved compared to Comparative Example 1-1 in which the non-fluidic electrolyte was not provided, and the battery thickness increase rate after the high-temperature storage decreased. In Examples 1-1 to 1-9 in which the volume ratio of the non-fluidic electrolyte was 6 vol % or less, the high-temperature capacity retention rate and the discharge temperature capacity retention rate were improved compared to Examples 1-10 to 1-12 and Comparative Example 1-1, and the battery thickness increase rate after the high-temperature storage decreased, and satisfactory results were obtained in all tests. In addition, the higher the heating temperature during forming the non-fluidic electrolyte layer was, the further the capacity retention rate in the high-temperature environment was improved, and the further the battery thickness increase rate after the high-temperature storage decreased.

This is considered to be because when the non-fluidic electrolyte layer is provided, the separator, which is interposed between the positive electrode and the negative electrode, comes into close contact with the positive electrode and the negative electrode, and thus battery reactivity is improved. In addition, this is considered to be because when the volume ratio of the non-fluidic electrolyte is set to a predetermined ratio, high ion conductivity due to the fluidic electrolyte which does not gelate may be obtained while maintaining the close contact effect, and thus the battery reactivity is improved.

In addition, when the imide salt compound expressed by Chem. A is used as the electrolyte salt, the electrolyte salt is not likely to be decomposed even in the high-temperature environment. Therefore, the heating temperature during formation of the non-fluidic electrolyte layer may be raised, and thus even when it is thin, the non-fluidic electrolyte layer having high bonding strength is formed. As a result, the battery characteristics are improved.

On the other hand, even in the case of Examples 1-13 to 1-24, and Comparative Example 1-2 in which lithium hexafluorophosphate was used as the electrolyte salt, approximately the same tendency as Examples 1-1 to 1-12 and Comparative Example 1-1 in which the imide salt of Chem. A was used was obtained. However, in the case of using lithium hexafluorophosphate, the discharge temperature capacity retention rate was approximately constant regardless of the heating temperature during formation of the non-fluidic electrolyte layer, but the capacity retention rate in the high-temperature environment significantly decreased as the heating temperature was raised, and thus the battery thickness increase rate after the high-temperature storage increased. This is considered to be because lithium hexafluorophosphate has a tendency to be decomposed in a high-temperature environment compared to the imide salt compound expressed by Chem. A.

Therefore, it was revealed that it is preferable that both of the non-fluidic electrolyte and the fluidic electrolyte be present, and when the volume ratio of the non-fluidic electrolyte with respect to the entirety of the electrolyte is set to 0 to 6 vol %, relatively superior battery characteristic may be realized, and this is more preferable. In addition, in this case, it was understood that when a predetermined imide salt compound is used as the electrolyte salt, relatively superior battery characteristics may be obtained. Particularly, when the formation of the non-fluidic electrolyte was carried out at a relatively higher temperature, the battery characteristics were further improved. In this case, even when the volume ratio of the non-fluidic electrolyte was low, since the battery characteristics were not likely to decrease, and the volume ratio of the fluidic electrolyte increased, the battery characteristics were further improved.

Examples 2-1 to 2-7 and Comparative Example 2-1

In Examples 2-1 to 2-7 and Comparative Example 2-1, polyacrylonitrile (PAN) was used as the polymeric material forming the non-fluidic electrolyte layer, and battery characteristics were evaluated.

Example 2-1

A laminated film type battery was manufactured in the same manner as Example 1-1 except that polyacrylonitrile (PAN) having a weight-average molecular weight of 700,000 was used as the polymeric material applied to the surface of the separator, and the heating temperature during formation of the non-fluidic electrolyte layer was set to 80° C. In the battery of Example 2-1, the volume ratio of the non-fluidic electrolyte in the entirety of the electrolyte was 2.2 vol %.

Example 2-2

A laminated film type battery was manufactured in the same manner as Example 1-1 except that polyacrylonitrile (PAN) having a weight-average molecular weight of 700,000 was used as the polymeric material applied to the surface of the separator, and the heating temperature during formation of the non-fluidic electrolyte layer was set to 90° C. In the battery of Example 2-2, the volume ratio of the non-fluidic electrolyte in the entirety of the electrolyte was 2.2 vol %.

Example 2-3

A laminated film type battery was manufactured in the same manner as Example 1-1 except that polyacrylonitrile (PAN) having a weight-average molecular weight of 700,000 was used as the polymeric material applied to the surface of the separator, and the heating temperature during formation of the non-fluidic electrolyte layer was set to 100°

C. In the battery of Example 2-3, the volume ratio of the non-fluidic electrolyte in the entirety of the electrolyte was 2.2 vol %.

Example 2-4

A laminated film type battery was manufactured in the same manner as Example 1-1 except that polyacrylonitrile (PAN) having a weight-average molecular weight of 700,000 was used as the polymeric material applied to the surface of the separator, the thickness of polyacrylonitrile (PAN) applied to the surface of the separator was set to 2 μm for each surface (total thickness of both surfaces was 4 μm), and the heating temperature during formation of the non-fluidic electrolyte layer was set to 90° C. In the battery of Example 2-4, the volume ratio of the non-fluidic electrolyte in the entirety of the electrolyte was 4.1 vol %.

Example 2-5

A laminated film type battery was manufactured in the same manner as Example 1-1 except that polyacrylonitrile (PAN) having a weight-average molecular weight of 700,000 was used as the polymeric material applied to the surface of the separator, the thickness of polyacrylonitrile (PAN) applied to the surface of the separator was set to 3 μm for each surface (total thickness of both surfaces was 6 μm), and the heating temperature during formation of the non-fluidic electrolyte layer was set to 90° C. In the battery of Example 2-5, the volume ratio of the non-fluidic electrolyte in the entirety of the electrolyte was 5.6 vol %.

Examples 2-6 to 2-8

Laminated film type batteries were manufactured in the same manner as Examples 2-1 to 2-3 except that instead of the imide salt compound of Chem. A, hexafluorophosphate ($LiPF_6$) was used as the electrolyte salt. In the batteries of Examples 2-6 to 2-8, the volume ratio of the non-fluidic electrolyte in the entirety of the electrolyte was 2.2 vol %.

Evaluation of Battery
(a) High-Temperature Cycle Test
(b) High-Temperature Storage Test
(c) Discharge Temperature Characteristics Test Similarly to Example 1-1, the above-described tests were performed with respect to the respective examples and comparative examples to calculate the high-temperature capacity retention rate, the battery thickness increase rate after high-temperature storage, and the discharge temperature capacity retention rate, respectively.

Evaluation results are shown in Table 2 described below. In addition, in Table 2, Examples 1-1 to 1-3, and 1-10 to 1-12 in which polyvinylidene fluoride was used as the polymeric material, and Comparative Examples 1-1 and 1-2 in which the non-fluidic electrolyte layer was not provided are shown together for reference.

TABLE 2

| | Positive electrode active material Kind | Electrolyte salt | | Non-fluidic electrolyte layer | | | Volume ratio [vol %] |
| | | | | Gelation | | | |
| | | Kind | Concentration [mol/kg] | Polymer | Molecular weight | temperature [° C.] | Thickness [μm] | |
|---|---|---|---|---|---|---|---|---|
| Example 2-1 | $LiFePO_4$ | Chem. A | 1.0 | PAN | 700,000 | 80 | 2 | 2.2 |
| Example 2-2 | $LiFePO_4$ | Chem. A | 1.0 | PAN | 700,000 | 90 | 2 | 2.2 |
| Example 2-3 | $LiFePO_4$ | Chem. A | 1.0 | PAN | 700,000 | 100 | 2 | 2.2 |
| Example 2-4 | $LiFePO_4$ | Chem. A | 1.0 | PAN | 700,000 | 90 | 4 | 4.1 |
| Example 2-5 | $LiFePO_4$ | Chem. A | 1.0 | PAN | 700,000 | 90 | 6 | 5.6 |
| Example 1-1 | $LiFePO_4$ | Chem. A | 1.0 | PVdF | 1,000,000 | 100 | 2 | 2.2 |
| Example 1-2 | $LiFePO_4$ | Chem. A | 1.0 | PVdF | 1,000,000 | 110 | 2 | 2.2 |
| Example 1-3 | $LiFePO_4$ | Chem. A | 1.0 | PVdF | 1,000,000 | 120 | 2 | 2.2 |
| Comparative Example 1-1 | $LiFePO_4$ | Chem. A | 1.0 | — | — | — | — | — |
| Example 2-6 | $LiFePO_4$ | $LiPF_6$ | 1.0 | PAN | 700,000 | 80 | 2 | 2.2 |
| Example 2-7 | $LiFePO_4$ | $LiPF_6$ | 1.0 | PAN | 700,000 | 90 | 2 | 2.2 |
| Example 2-8 | $LiFePO_4$ | $LiPF_6$ | 1.0 | PAN | 700,000 | 100 | 2 | 2.2 |
| Example 1-10 | $LiFePO_4$ | $LiPF_6$ | 1.0 | PVdF | 1,000,000 | 100 | 2 | 2.2 |
| Example 1-11 | $LiFePO_4$ | $LiPF_6$ | 1.0 | PVdF | 1,000,000 | 110 | 2 | 2.2 |
| Example 1-12 | $LiFePO_4$ | $LiPF_6$ | 1.0 | PVdF | 1,000,000 | 120 | 2 | 2.2 |
| Comparative Example 1-2 | $LiFePO_4$ | $LiPF_6$ | 1.0 | — | — | — | — | — |

| | High-temperature capacity retention rate [%] | Battery thickness increase rate after high-temperature storage [%] | Discharge temperature capacity retention rate [%] |
|---|---|---|---|
| Example 2-1 | 84 | 5.1 | 92 |
| Example 2-2 | 85 | 4.9 | 94 |
| Example 2-3 | 85 | 5.0 | 94 |
| Example 2-4 | 89 | 4.5 | 95 |
| Example 2-5 | 86 | 4.2 | 94 |
| Example 1-1 | 90 | 5.6 | 95 |
| Example 1-2 | 92 | 5.2 | 95 |
| Example 1-3 | 92 | 5.3 | 96 |
| Comparative Example 1-1 | 71 | 8.3 | 85 |
| Example 2-6 | 49 | 16.6 | 88 |

TABLE 2-continued

| | | | |
|---|---|---|---|
| Example 2-7 | 50 | 16.4 | 91 |
| Example 2-8 | 48 | 17.7 | 91 |
| Example 1-10 | 48 | 16.5 | 92 |
| Example 1-11 | 46 | 16.3 | 90 |
| Example 1-12 | 40 | 19.4 | 90 |
| Comparative Example 1-2 | 42 | 22.5 | 83 |

As can be seen from Table 2, in a case where the imide salt compound expressed by Chem. A was used as the electrolyte salt, in Examples 2-1 to 2-5 in which polyacrylonitrile was used as the polymeric material, approximately the same battery characteristics as Examples 1-1 to 1-3 in which polyvinylidene fluoride was used as the polymeric material were obtained. In addition, the battery characteristics were significantly improved compared to Comparative Example 1-1 in which the non-fluidic electrolyte layer was not provided.

In addition, even when lithium hexafluorophosphate was used as the electrolyte salt, in Examples 2-6 to 2-8 in which polyacrylonitrile was used as the polymeric material, approximately the same battery characteristics as Examples 1-10 to 1-12 in which polyvinylidene fluoride was used as the polymeric material were obtained. In this case, the battery characteristics were also significantly improved compared to Comparative Example 1-1 in which the non-fluidic electrolyte layer was not provided.

Examples 3-1 to 3-6

In Examples 3-1 to 3-6, the battery characteristics were evaluated by changing the weight-average molecular weight of the polymeric material forming the non-fluidic electrolyte layer.

Example 3-1

A laminated film type battery was manufactured in the same manner as Example 1-13 except that polyvinylidene fluoride (PVdF) having a weight-average molecular weight of 350,000 was used as the polymeric material applied to the surface of the separator.

Example 3-2

A laminated film type battery was manufactured in the same manner as Example 1-13 except that polyvinylidene fluoride (PVdF) having a weight-average molecular weight of 500,000 was used as the polymeric material applied to the surface of the separator.

Example 3-3

A laminated film type battery was manufactured in the same manner as Example 1-13 except that polyvinylidene fluoride (PVdF) having a weight-average molecular weight of 750,000 was used as the polymeric material applied to the surface of the separator.

Example 3-4

A laminated film type battery was manufactured in the same manner as Example 1-13.

Example 3-5

A laminated film type battery was manufactured in the same manner as Example 1-13 except that polyacrylonitrile (PAN) having a weight-average molecular weight of 350,000 was used as the polymeric material applied to the surface of the separator, and the heating temperature during formation of the non-fluidic electrolyte layer was set to 80° C.

Example 3-6

A laminated film type battery was manufactured in the same manner as Example 1-13 except that polyacrylonitrile (PAN) having a weight-average molecular weight of 700,000 was used as the polymeric material applied to the surface of the separator, and the heating temperature during formation of the non-fluidic electrolyte layer was set to 80° C.

Evaluation of Battery
 (a) High-Temperature Cycle Test
 (b) High-Temperature Storage Test
 (c) Discharge Temperature Characteristics Test Similarly to Example 1-1, the above-described tests were performed with respect to the respective examples and comparative examples to calculate the high-temperature capacity retention rate, the battery thickness increase rate after high-temperature storage, and the discharge temperature capacity retention rate, respectively.

Evaluation results are shown in Table 3 described below. In addition, in Table 3, Comparative Example 1-2 in which the non-fluidic electrolyte layer was not provided is shown together for reference.

TABLE 3

| | Positive electrode active material Kind | Electrolyte salt | | Non-fluidic electrolyte layer | | | | |
|---|---|---|---|---|---|---|---|---|
| | | | | | Gelation | | | Volume |
| | | Kind | Concentration [mol/kg] | Polymer | Molecular weight | temperature [° C.] | Thickness [μm] | ratio [vol %] |
| Example 3-1 | LiFePO$_4$ | LiPF$_6$ | 1.0 | PVdF | 350,000 | 100 | 2 | 2.2 |
| Example 3-2 | LiFePO$_4$ | LiPF$_6$ | 1.0 | PVdF | 500,000 | 100 | 2 | 2.2 |
| Example 3-3 | LiFePO$_4$ | LiPF$_6$ | 1.0 | PVdF | 750,000 | 100 | 2 | 2.2 |
| Example 3-4 | LiFePO$_4$ | LiPF$_6$ | 1.0 | PVdF | 1,00,0000 | 100 | 2 | 2.2 |
| Example 3-5 | LiFePO$_4$ | LiPF$_6$ | 1.0 | PAN | 350,000 | 80 | 2 | 2.2 |
| Example 3-6 | LiFePO$_4$ | LiPF$_6$ | 1.0 | PAN | 700,000 | 80 | 2 | 2.2 |

TABLE 3-continued

| | | | | | | | | |
|---|---|---|---|---|---|---|---|---|
| Comparative Example 1-2 | LiFePO$_4$ | LiPF$_6$ | 1.0 | — | — | — | — | — |

| | High-temperature capacity retention rate [%] | Battery thickness increase rate after high-temperature storage [%] | Discharge temperature capacity retention rate [%] |
|---|---|---|---|
| Example 3-1 | 44 | 19.7 | 88 |
| Example 3-2 | 47 | 16.8 | 91 |
| Example 3-3 | 48 | 16.6 | 92 |
| Example 3-4 | 48 | 16.5 | 92 |
| Example 3-5 | 42 | 21.8 | 86 |
| Example 3-6 | 49 | 16.6 | 88 |
| Comparative Example 1-2 | 42 | 22.5 | 83 |

As can be seen from Table 3, in Examples 3-1 to 3-4 in which polyvinylidene fluoride was used as the polymeric material, the further the weight-average molecular weight of the polyvinylidene fluoride increased, the further the battery characteristics were improved. This is considered to be because when the weight-average molecular weight of the polyvinylidene fluoride increased, adhesiveness of the non-fluidic electrolyte layer further increases, and thus the battery reactivity between the positive electrode and the negative electrode increases.

In addition, in Examples 3-5 and 3-6 in which polyacrylonitrile was used as the polymeric material, the same tendency was also observed.

In all of Examples 3-1 to 3-6, the battery characteristics were improved compared to Comparative Example 1-2 in which the non-fluidic electrolyte layer was not provided.

Examples 4-1 to 4-6

In Examples 4-1 to 4-6, a kind of positive electrode active material and a kind of electrolyte salt were changed and the non-fluidic electrolyte layer was formed in such a manner that the volume ratio thereof was approximately constant, and then the battery characteristics were evaluated.

Example 4-1

A laminated film type battery was manufactured in the same manner as Example 1-5 except that instead of the imide salt compound of Chem. A, the imide salt compound of Chem. B was used as the electrolyte salt. In the battery of Example 4-1, the volume ratio of the non-fluidic electrolyte in the entirety of the electrolyte was 4.1 vol %.

Example 4-2

A laminated film type battery was manufactured in the same manner as Example 1-5 except that instead of the imide salt compound of Chem. A, the imide salt compound of Chem. C was used as the electrolyte salt. In the battery of Example 4-2, the volume ratio of the non-fluidic electrolyte in the entirety of the electrolyte was 4.1 vol %.

Example 4-3

A laminated film type battery was manufactured in the same manner as Example 1-5 except that instead of lithium iron phosphate (LiFePO$_4$), lithium iron manganese phosphate (LiFe$_{0.75}$Mn$_{0.25}$PO$_4$) was used as the positive electrode active material. In the battery of Example 4-3, the volume ratio of the non-fluidic electrolyte in the entirety of the electrolyte was 4.1 vol %.

Example 4-4

A laminated film type battery was manufactured in the same manner as Example 1-5 except that instead of lithium iron phosphate (LiFePO$_4$), lithium manganese phosphate (LiMnPO$_4$) was used as the positive electrode active material. In the battery of Example 4-4, the volume ratio of the non-fluidic electrolyte in the entirety of the electrolyte was 4.1 vol %.

Example 4-5

A laminated film type battery was manufactured in the same manner as Example 1-5 except that instead of lithium iron phosphate (LiFePO$_4$), lithium cobaltate (LiCoO$_2$) was used as the positive electrode active material, and the layer thickness was set to 1 μm for each surface (total thickness of both surfaces was 2 μm). In the battery of Example 4-5, the volume ratio of the non-fluidic electrolyte in the entirety of the electrolyte was 4.2 vol %. Since a volume density of the positive electrode active layer varies (increases) when lithium cobaltate (LiCoO$_2$) is used as the positive electrode active material, the thickness of the non-fluidic electrolyte layer was adjusted such that the volume ratio of the non-fluidic electrolyte layer is approximately the same as Example 4-1.

Example 4-6

A laminated film type battery was manufactured in the same manner as Example 1-5 except that instead of lithium iron phosphate (LiFePO$_4$), lithium nickel cobalt manganese composite oxide (LiNi$_{0.33}$Co$_{0.33}$Mn$_{0.33}$O$_2$) was used as the positive electrode active material, and the layer thickness was set to 1 μm for each surface (total thickness of both surfaces was 2 μm). In the battery of Example 4-6, the volume ratio of the non-fluidic electrolyte in the entirety of the electrolyte was 4.2 vol %.

Evaluation of Battery
(a) High-Temperature Cycle Test
(b) High-Temperature Storage Test
(c) Discharge Temperature Characteristics Test Similarly to Example 1-1, the above-described tests were performed with respect to the respective examples and comparative examples to calculate the high-temperature capacity retention rate, the battery thickness increase rate after high-temperature storage, and the discharge temperature capacity retention rate, respectively. In addition, in Examples 4-5 and 4-6 in which a cobalt-based positive electrode active material having a layered structure was used, the upper limit voltage during charging was set to 4.2 V, and a discharge termination voltage was set to 3.0 V. Otherwise, the above-described tests were carried out in the same manner as Example 1-1.

Evaluation results are shown in Table 4 described below. In addition, in Table 4, Examples 1-5 and 1-17, and Comparative Example 1-1 in which the non-fluidic electrolyte layer was not provided are shown together for reference.

olivine structure was, the better the battery characteristics were obtained.

In all of Examples 4-1 to 4-6, the battery characteristics were improved compared to Comparative Example 1-1 in which the non-fluidic electrolyte layer was not provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

TABLE 4

| | Positive electrode active material Kind | Electrolyte salt | | Non-fluidic electrolyte layer | | | |
|---|---|---|---|---|---|---|---|
| | | Kind | Concentration [mol/kg] | Polymer | Molecular weight | Gelation temperature [° C.] | Thickness [μm] | Volume ratio [vol %] |
| Example 1-5 | $LiFePO_4$ | Chem. A | 1.0 | PVdF | 1,00,0000 | 110 | 4 | 4.1 |
| Example 4-1 | $LiFePO_4$ | Chem. B | 1.0 | PVdF | 1,00,0000 | 110 | 4 | 4.1 |
| Example 4-2 | $LiFePO_4$ | Chem. C | 1.0 | PVdF | 1,00,0000 | 110 | 4 | 4.1 |
| Example 4-3 | $LiFe_{0.75}Mn_{0.25}PO_4$ | Chem. A | 1.0 | PVdF | 1,00,0000 | 110 | 4 | 4.1 |
| Example 4-4 | $LiMnPO_4$ | Chem. A | 1.0 | PVdF | 1,00,0000 | 110 | 4 | 4.1 |
| Example 4-5 | $LiCoO_2$ | Chem. A | 1.0 | PVdF | 1,00,0000 | 110 | 2 | 4.2 |
| Example 4-6 | $LiNi_{0.33}Co_{0.33}Mn_{0.33}O_2$ | Chem. A | 1.0 | PVdF | 1,00,0000 | 110 | 2 | 4.2 |
| Example 1-17 | $LiFePO_4$ | $LiPF_6$ | 1.0 | PVdF | 1,00,0000 | 110 | 4 | 4.1 |
| Comparative Example 1-1 | $LiFePO_4$ | Chem. A | 1.0 | — | — | — | — | — |

| | High-temperature capacity retention rate [%] | Battery thickness increase rate after high-temperature storage [%] | Discharge temperature capacity retention rate [%] |
|---|---|---|---|
| Example 1-5 | 92 | 5.0 | 95 |
| Example 4-1 | 91 | 4.6 | 92 |
| Example 4-2 | 82 | 6.1 | 88 |
| Example 4-3 | 88 | 5.9 | 90 |
| Example 4-4 | 86 | 6.3 | 86 |
| Example 4-5 | 72 | 8.4 | 83 |
| Example 4-6 | 78 | 8.7 | 87 |
| Example 1-17 | 55 | 14.2 | 89 |
| Comparative Example 1-1 | 71 | 8.3 | 85 |

As can be seen from Table 4, in Examples 4-1, 4-2, and 1-5 in which lithium iron phosphate ($LiFePO_4$) was used as the positive electrode active material, in a case of using an imide salt in which at least one of the substituent groups Z in Chem. 1 is a fluorine atom, the battery characteristics were significantly improved.

In addition, in Examples 4-3 to 4-6 and 1-5 in which the imide salt compound expressed by Chem. A was used as the electrolyte salt, in a case of using a material having an olivine structure as the positive electrode active material, the battery characteristics were significantly improved. Among these, the battery characteristics were improved in a case of using lithium manganese iron phosphate in which iron (Fe) and manganese (Mn) were contained as a transition metal compared to lithium manganese phosphate in which manganese (Mn) was contained as a transition metal, and in a case of using lithium iron phosphate containing only iron (Fe) was contained as a transition metal, the battery characteristics were further improved. That is, the larger the content of iron as a transition metal in a material having an The invention is claimed as follows:

1. A battery comprising:
   a positive electrode;
   a negative electrode; and
   an electrolyte including a fluidic electrolyte and a non-fluidic electrolyte, the fluidic electrolyte configured to be imaged as a void image in a secondary electron image and a reflection electron image obtained by energy dispersive X-ray spectroscopy, and the non-fluidic electrolyte configured to be imaged in the secondary electron image and the reflection electron image with a non-fluidic electrolyte contrast different from a contrast associated with a member selected from the group consisting of a solid current collector, an active material, a conductive material, a binding material and a separator, wherein a content of the non-fluidic electrolyte is greater than 0 up to 6% by volume with respect to the electrolyte.

2. The battery according to claim 1, wherein the non-fluidic electrolyte is present between the positive electrode and the negative electrode, and the fluidic electrolyte is present at least in a void inside active material layers of the positive electrode and the negative electrode.

3. The battery according to claim 2, wherein the fluidic electrolyte is present between the positive electrode and the negative electrode.

4. The battery according to claim 1, wherein the separator is interposed between the positive electrode and the negative electrode, and the non-fluidic electrolyte is present between the separator and at least one of the positive electrode and the negative electrode.

5. The battery according to claim 1, wherein the electrolyte includes an electrolyte salt, and wherein the electrolyte salt includes an imide salt compound expressed by Chem. 1, $$M^+[(ZY)_2N]^- \qquad \text{(Chem. 1)}$$

where $M^+$ represents a monovalent cation, Y represents $SO_2$ or CO, and Z represents a fluorine atom.

6. The battery according to claim 5, wherein at least one Z is a fluorine atom.

7. The battery according to claim 1, wherein the non-fluidic electrolyte comprises a polymeric material, and a weight-average molecular weight of the polymeric material is 500,000 or more and 1,000,000 or less.

8. The battery according to claim 7, wherein the polymeric material is at least one of polyvinylidene fluoride and polyacrylonitrile.

9. The battery according to claim 1, wherein an active material of the positive electrode includes a lithium composite phosphate having an olivine type structure expressed by Chem. I, $$Li_aM1_bPO_4 \qquad \text{(Chem. I)}$$

where M1 represents at least one element selected from group II to group XV, and a and b represent values within ranges of $0 \leq a \leq 2.0$ and $0.5 \leq b \leq 2.0$.

10. The battery according to claim 9, wherein M1 includes iron.

11. A battery pack comprising:
the battery according to claim 1;
a control unit that controls the battery; and
an exterior package in which the battery is accommodated.

12. A battery comprising:
a positive electrode;
a negative electrode; and
an electrolyte including a fluidic electrolyte and a non-fluidic electrolyte, the fluidic electrolyte configured to be imaged as a void image in a secondary electron image and a reflection electron image obtained by energy dispersive X-ray spectroscopy, and the non-fluidic electrolyte configured to be imaged in the secondary electron image and the reflection electron image with a non-fluidic electrolyte contrast different from a contrast associated with a member selected from the group consisting of a solid current collector, an active material, a conductive material, a binding material and a separator, wherein the non-fluidic electrolyte includes an electrolytic solution including a solvent and an electrolyte salt, and wherein a content of the electrolytic solution in the non-fluidic electrolyte is 90 to 99% by mass.

13. A battery comprising:
a positive electrode;
a negative electrode; and
an electrolyte including a fluidic electrolyte and a non-fluidic electrolyte, the fluidic electrolyte configured to be imaged as a void image in a secondary electron image and a reflection electron image obtained by energy dispersive X-ray spectroscopy, and the non-fluidic electrolyte configured to be imaged in the secondary electron image and the reflection electron image with a non-fluidic electrolyte contrast different from a contrast associated with a member selected from the group consisting of a solid current collector, an active material, a conductive material, a binding material and a separator,
wherein a content of the non-fluidic electrolyte is greater than 0 up to 6% by volume with respect to the electrolyte, and
wherein the non-fluidic electrolyte includes an electrolytic solution including a solvent and an electrolyte salt, and wherein a content of the electrolytic solution in the non-fluidic electrolyte is 90 to 99% by mass.

14. An apparatus comprising the battery according to claim 1, wherein the apparatus is selected from the group consisting of an electronic apparatus, an electrically driven vehicle, an electrical storage device, and an electric power system.

15. An apparatus comprising the battery according to claim 12, wherein the apparatus is selected from the group consisting of an electronic apparatus, an electrically driven vehicle, an electrical storage device, and an electric power system.

16. An apparatus comprising the battery according to claim 13, wherein the apparatus is selected from the group consisting of an electronic apparatus, an electrically driven vehicle, an electrical storage device, and an electric power system.

17. The battery according to claim 12, wherein the non-fluidic electrolyte is present between the positive electrode and the negative electrode, and the fluidic electrolyte is present at least in a void inside active material layers of the positive electrode and the negative electrode.

18. The battery according to claim 13, wherein the non-fluidic electrolyte is present between the positive electrode and the negative electrode, and the fluidic electrolyte is present at least in a void inside active material layers of the positive electrode and the negative electrode.

19. The battery according to claim 12, wherein the separator is interposed between the positive electrode and the negative electrode, and the non-fluidic electrolyte is present between the separator and at least one of the positive electrode and the negative electrode.

20. The battery according to claim 13, wherein the separator is interposed between the positive electrode and the negative electrode, and the non-fluidic electrolyte is present between the separator and at least one of the positive electrode and the negative electrode.

21. The battery according to claim 12, wherein the electrolyte includes an electrolyte salt, and wherein the electrolyte salt includes an imide salt compound expressed by Chem. 1, $$M^+[(ZY)_2N]^- \qquad \text{(Chem. 1)}$$

where $M^+$ represents a monovalent cation, Y represents $SO_2$ or CO, and Z represents a fluorine atom.

22. The battery according to claim 13, wherein the electrolyte includes an electrolyte salt, and wherein the electrolyte salt includes an imide salt compound expressed by Chem. 1, $$M^+[(ZY)_2N]^- \qquad \text{(Chem. 1)}$$

where $M^+$ represents a monovalent cation, Y represents $SO_2$ or CO, and Z represents a fluorine atom.

23. The battery according to claim 12, wherein the non-fluidic electrolyte comprises a polymeric material, and a weight-average molecular weight of the polymeric material is 500,000 or more and 1,000,000 or less.

24. The battery according to claim 13, wherein the non-fluidic electrolyte comprises a polymeric material, and a weight-average molecular weight of the polymeric material is 500,000 or more and 1,000,000 or less.

25. The battery according to claim 12, wherein an active material of the positive electrode includes a lithium composite phosphate having an olivine type structure expressed by Chem. I, $$Li_aM1_bPO_4 \qquad \text{(Chem. I)}$$

where M1 represents at least one element selected from group II to group XV, and a and b represent values within ranges of $0 \leq a \leq 2.0$ and $0.5 \leq b \leq 2.0$.

26. The battery according to claim 13, wherein an active material of the positive electrode includes a lithium composite phosphate having an olivine type structure expressed by Chem. I, $$Li_aM1_bPO_4 \qquad \text{(Chem. I)}$$

where M1 represents at least one element selected from group II to group XV, and a and b represent values within ranges of $0 \leq a \leq 2.0$ and $0.5 \leq b \leq 2.0$.

27. A battery pack comprising:
the battery according to claim 12;
a control unit that controls the battery; and
an exterior package in which the battery is accommodated.

28. A battery pack comprising:
the battery according to claim 13;
a control unit that controls the battery; and
an exterior package in which the battery is accommodated.

* * * * *